(12) United States Patent
McCann et al.

(10) Patent No.: US 8,209,704 B1
(45) Date of Patent: Jun. 26, 2012

(54) TECHNIQUES FOR USER SPACE AND KERNEL SPACE COMMUNICATION

(75) Inventors: Peter J. McCann, Mason, NH (US); Christopher M. Gould, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 1005 days.

(21) Appl. No.: 12/079,822

(22) Filed: Mar. 28, 2008

(51) Int. Cl.
*G06F 9/52* (2006.01)

(52) U.S. Cl. ......... 719/312; 711/130; 711/147; 711/202

(58) Field of Classification Search .................. None
See application file for complete search history.

(56) References Cited

U.S. PATENT DOCUMENTS

| | | | | |
|---|---|---|---|---|
| 5,652,885 A | * | 7/1997 | Reed et al. | 713/1 |
| 5,881,286 A | * | 3/1999 | Kougiouris et al. | 719/312 |
| 6,161,169 A | * | 12/2000 | Cheng | 711/150 |
| 7,152,231 B1 | * | 12/2006 | Galluscio et al. | 719/312 |
| 7,448,049 B1 | * | 11/2008 | Xing | 719/318 |

OTHER PUBLICATIONS

Apple, Kernel Programming Guide, Jun. 4, 2005, pp. 123-125.*
U.S. Appl. No. 11/824,542, filed Jun. 29, 2007, McCann et al.
U.S. Appl. No. 11/824,506, filed Jun. 29, 2007, Gould et al.
U.S. Appl. No. 12/079,759, filed Mar. 28, 2008, McCann et al.

* cited by examiner

*Primary Examiner* — S. Sough
*Assistant Examiner* — Syed Roni
(74) *Attorney, Agent, or Firm* — Muirhead and Saturnelli, LLC

(57) ABSTRACT

Described are techniques for intermodule communication between a first code module and a second code module wherein one of the first and second code modules executing in user space and the other of the first and second code modules executing in kernel space. A shared memory portion includes storage for one or more commands. A first first-in-first-out (FIFO) structure is used to send a location in the shared memory portion from the first to the second code module. A second FIFO structure is used for sending a location in the shared memory portion from the second to the first code module. The first code module stores command data for a command at a first location in the shared memory portion. A command is issued from the first to the second code module by sending the first location using the first FIFO structure.

18 Claims, 34 Drawing Sheets

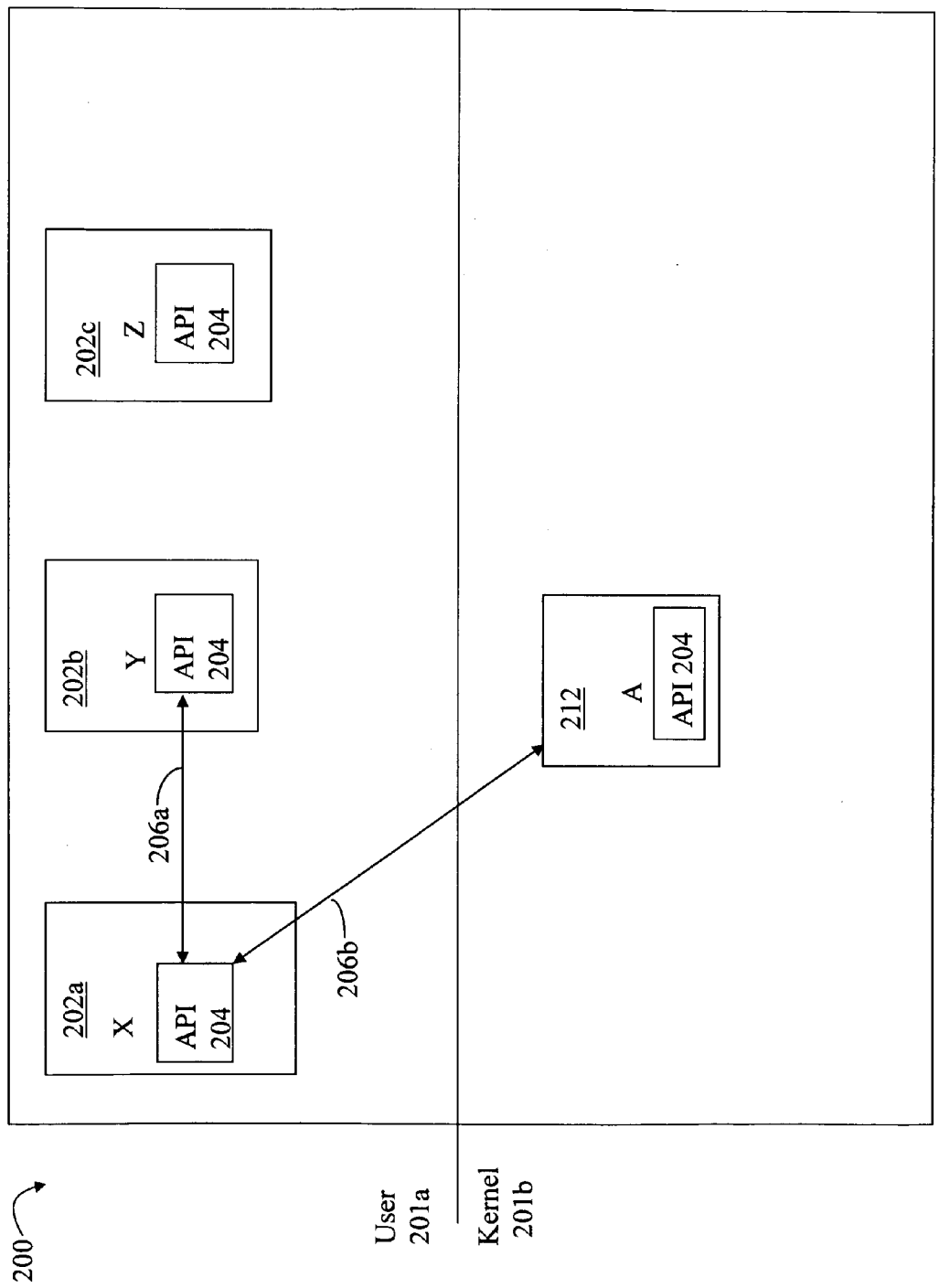

```
280 ─┐
282 ─┤ init()
284 ─┤ execute (INPUT PARAMS= ic-id,            /* server identifier */
                 input-code,                    /*input processing code */
                 input-buffer-base,             /* input data base address */
                 input-buffer-len,              /* input data length */
                 output-buffer-base,            /* output data base address */
                 output-buffer-len,             /* length of output data area */
                 OUTPUT PARAMS=
                 &output-buffer-len-actual,     /* actual size of output data or results */
                 &output-status-code,           /* output status of execute operation performed */

INPUT PARAMS=
                 completion-callback,           /* Call backs */
                 completion-context,            /* called as completion-callback (completion-context)*/ input-prepare-callback,        /* called as input-prepare-callback (input-buffer-base,
                                                   input-buffer-len, input-data-area) */ output-prepare-callback,       /* called as output-prepare-callback (output-buffer-base,
                                                   output-buffer-len, output-data-area) */ input-post-callback,           /* called as input-post-callback (input-buffer-base,
                                                   input-buffer-len, input-data-area) */ output-post-callback,          /* called as output-post-callback (output-buffer-base,
                                                   output-buffer-len-actual, output-data-area) */
                 )
286 ─┤ deinit ()
```

FIGURE 3

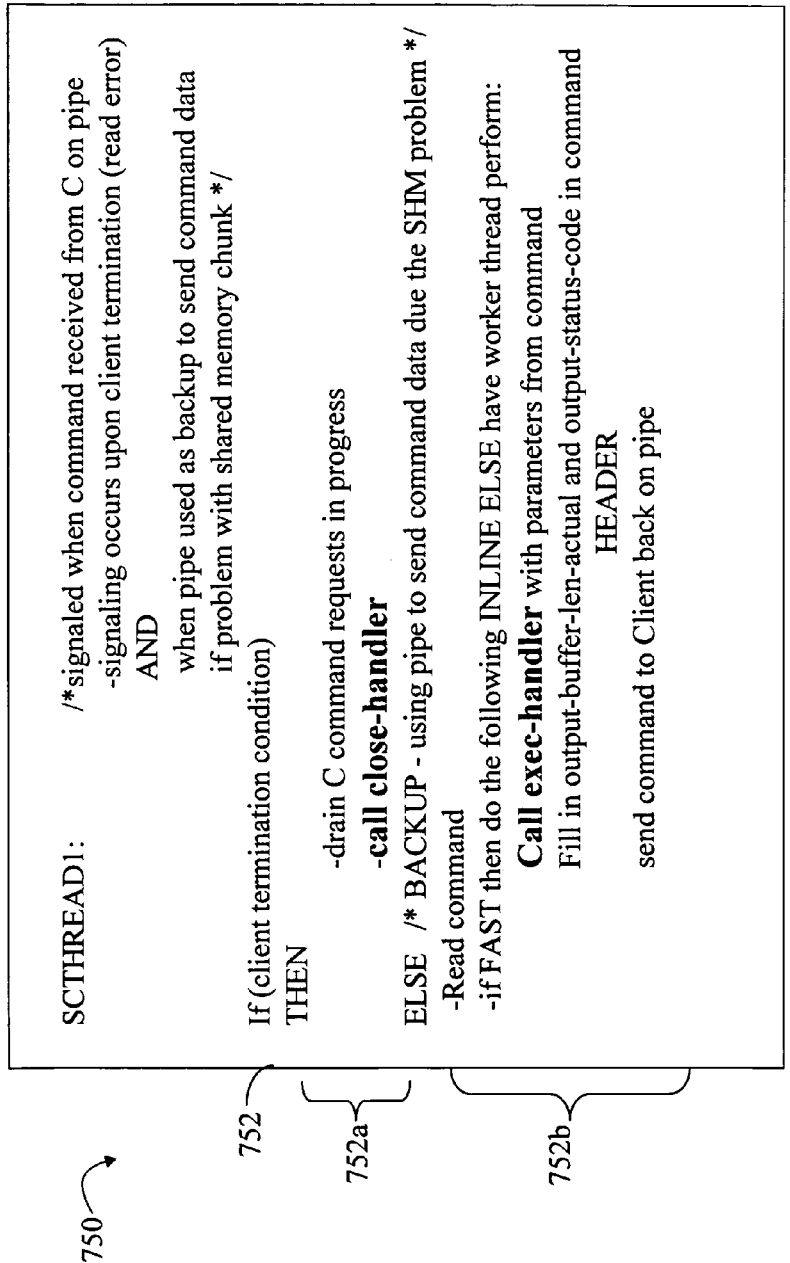

```
SCTHREAD1:        /*signaled when command received from C on pipe
                  -signaling occurs upon client termination (read error)
                  AND
                  when pipe used as backup to send command data
                  if problem with shared memory chunk */

If (client termination condition)
THEN
      -drain C command requests in progress
      -call close-handler
ELSE  /* BACKUP - using pipe to send command data due the SHM problem */
      -Read command
      -if FAST then do the following INLINE ELSE have worker thread perform:
      Call exec-handler with parameters from command
      Fill in output-buffer-len-actual and output-status-code in command
                                    HEADER
            send command to Client back on pipe
```

FIGURE 9B execute
- allocate slot in shared memory for command
- call input-prepare-callback
- call output-prepare-callback
if NORMAL MODE and CS SHM FIFO used to transmit command offset then
   -fill in COMMAND HEADER in SHMEM
   -send command offset to K/server over CS SHM FIFO (wait for server to complete)
   -SC SHM FIFO thread (SCM signaled) receives command offset from server
   and SCM thread performs:
      -call input-post-callback
      -call output-post-calback
      -free command space in shared memory "chunk"
      -call completion-callback
ELSE if NORMAL MODE and I/O CTL used to transmit command offset then
   -fill in COMMAND HEADER in SHMEM
   -send command offset to K/server as parameter using I/O CTL
    (wait for return from server/K)
      -call input-post-callback
      -call output-post-calback
      -free command space in shared memory "chunk"
      -call completion-callback
ELSE if BACKUP MODE, /* use I/O CTL to transmit command data */
   -store command including HEADER data
   -send pointer to command data using I/O CTL (wait for return)
      -call input-post-callback
      -call output-post-calback
      -call completion-callback

FIG. 13B

TECHNIQUES FOR USER SPACE AND KERNEL SPACE COMMUNICATION

BACKGROUND

1. Technical Field

This application generally relates to code execution, and more particularly to techniques used for communicating between different code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Code modules that execute on a data storage system, as well as other systems, may use a variety of different techniques for inter-module communications. An environment in which the code executes may provide a facility for such inter-module communication. It may be desirable to utilize a flexible and efficient communication model and facility allowing messages to be exchanged between executing code modules.

SUMMARY OF THE INVENTION

In accordance with one aspect of the invention is a method of intermodule communication between a first code module and a second code module comprising: providing said first code module and a second code module, one of said first and second code modules executing in user space and the other of said first and second code modules executing in kernel space; providing a shared memory portion including storage for one or more commands and which is accessible to said first and said second code modules; providing a first first-in-first-out (FIFO) structure for sending a location in said shared memory portion from said first code module to said second code module; providing a second FIFO structure for sending a location in said shared memory portion from said second code module to said first code module; storing, by said first code module, command data for a command at a first location in said shared memory portion; and issuing a command from said first code module to said second code module by sending said first location from said first code module to said second code module using said first FIFO structure. The command may be a request from said first code module for said second code module to perform processing in accordance with said command data stored at said first location in shared memory. The first FIFO structure and said second FIFO structure may be implemented using another portion of shared memory accessible to said first code module and said second code module. The first code module may include a first call to code of an application programming interface, said first call including one or more callbacks referencing a location in said first code module. The method may include invoking, by said code of said application programming interface, a first of said one or more callbacks prior to performing said issuing, said first callback performing processing in connection with input data included in said command data stored at said first location in said shared memory portion. The command data may include a header portion, an input data area, and an output data area, said header portion including metadata for said command and storage for one or more input parameters and one or more output parameters. The one or more input parameters and input data in said input data area may be sent to said second code module from said first code module, and said one or more output parameters and output data in said output data area may be sent from said second code module to said first code module. The method may include: performing, by said second code module, processing in accordance with said command data; storing output data in said output data area in accordance with said performing; storing values for said one or more output parameters in accordance with said performing; and sending a message from said second code module to said first code module as a response to said command by sending said first location from said second code module to said first code module using said second FIFO structure. The performing processing by said second code module may include invoking one or more callbacks referencing locations in said second code module. The one or more callbacks in said second code module may be included in a first call of said second code module to code of an application programming interface. The first call of said second code module may occur prior to execution of said step of performing processing by said second code module. The method may also include performing additional processing by said first code module upon receiving said message from said second code module. The additional processing may include invoking a second of said one or more callbacks in said first code module to perform post processing on one or more of said input data area and said output data area. The issuing of said command may be performed asynchronously with respect to said first code module. The method may further comprise invoking a third of said one or more callbacks of said first code module after said second callback to indicate completion of said command. The method may also include providing a kernel device to which said one code module executing in user space can issue a system call, wherein a registered routine of said other code module executing in kernel mode is notified when said kernel device is closed by said one code module, said kernel device being closed when said one code module terminates causing invocation of said registered routine. The first code module may executes in user space and said second code module may execute in kernel space. If said first code module is unable to use said shared memory portion for storing command data, said first code module may issue a system call to said kernel device. The system call may include a parameter that is an address of a location in user space at which said command data is stored. In response to the system call being issued by said first code module, a second registered routine in said second code module may be invoked and may perform processing including: receiving said parameter; allocating storage in kernel space; storing said command data at said storage in kernel space; performing processing of said command data stored in kernel space; updating command data stored at said user space location; and returning to said first code module. The first code module may execute in kernel space and said second code module may execute in user space, and if said first code module is unable to use said shared memory portion for storing command data, said first code module and said second code module may communicate using a loop back connection and sending said command data over said loopback connection. The first call included in said first code module may use a first defined interface. The first defined interface may be used when said first code module executes in user space and said first defined interface may be used when said first code module executes in kernel space. The first call of said second code module to code of an application programming interface may use a first defined interface and said first defined interface may be used when said second code module executes in user space and when said second code module executes in kernel space.

In accordance with another aspect of the invention is a data storage system comprising executable code stored on a computer readable medium for intermodule communication between a first code module and a second code module, the computer readable medium comprising executable code for: providing said first code module executing in user space and said second code module each executing in kernel space; providing a shared memory portion including storage for one or more commands and which is accessible to said first and said second code modules; providing a kernel device to which said first code module issues a system call that is a command request handled by a registered routine in said second code module, said registered routine being notified when said first code module issues said system call; storing, by said first code module, command data for a command at a first location in said shared memory portion; and issuing a command from said first code module to said second code module by issuing a system call to said kernel device resulting in invocation of said registered routine, a parameter of said system call being said first location in said shared memory. A second registered routine in said second code module may be notified when said first module closes said kernel device. The first code module may close said kernel device when said first code module terminates causing invocation of said second registered routine. The first code module may include a call to code of an application programming interface, said call including one or more callbacks referencing a location in said first code module. The second code module may include a call to code of an application programming interface. The call may include one or more callbacks referencing a location in said second code module.

BRIEF DESCRIPTION OF THE DRAWINGS

Features and advantages of the present invention will become more apparent from the following detailed description of exemplary embodiments thereof taken in conjunction with the accompanying drawings in which:

FIG. 2 is an example illustrating use of an API (application programming interface) in connection with a same code module that may be executed in user space and kernel space;

FIG. 3 is an example illustrating a client-side API for use in connection with the techniques herein;

FIGS. 7, 8A, 8B, 9A, 9B, and 9C are examples illustrating in more detail processing that may be performed for the U-U case in an embodiment using the techniques herein;

FIGS. 13A, 13B, 13C, 13D and 13E are examples illustrating in more detail processing steps that may be performed in connection with the U-K case in an embodiment;

DETAILED DESCRIPTION OF EMBODIMENT(S)

Figure 1:
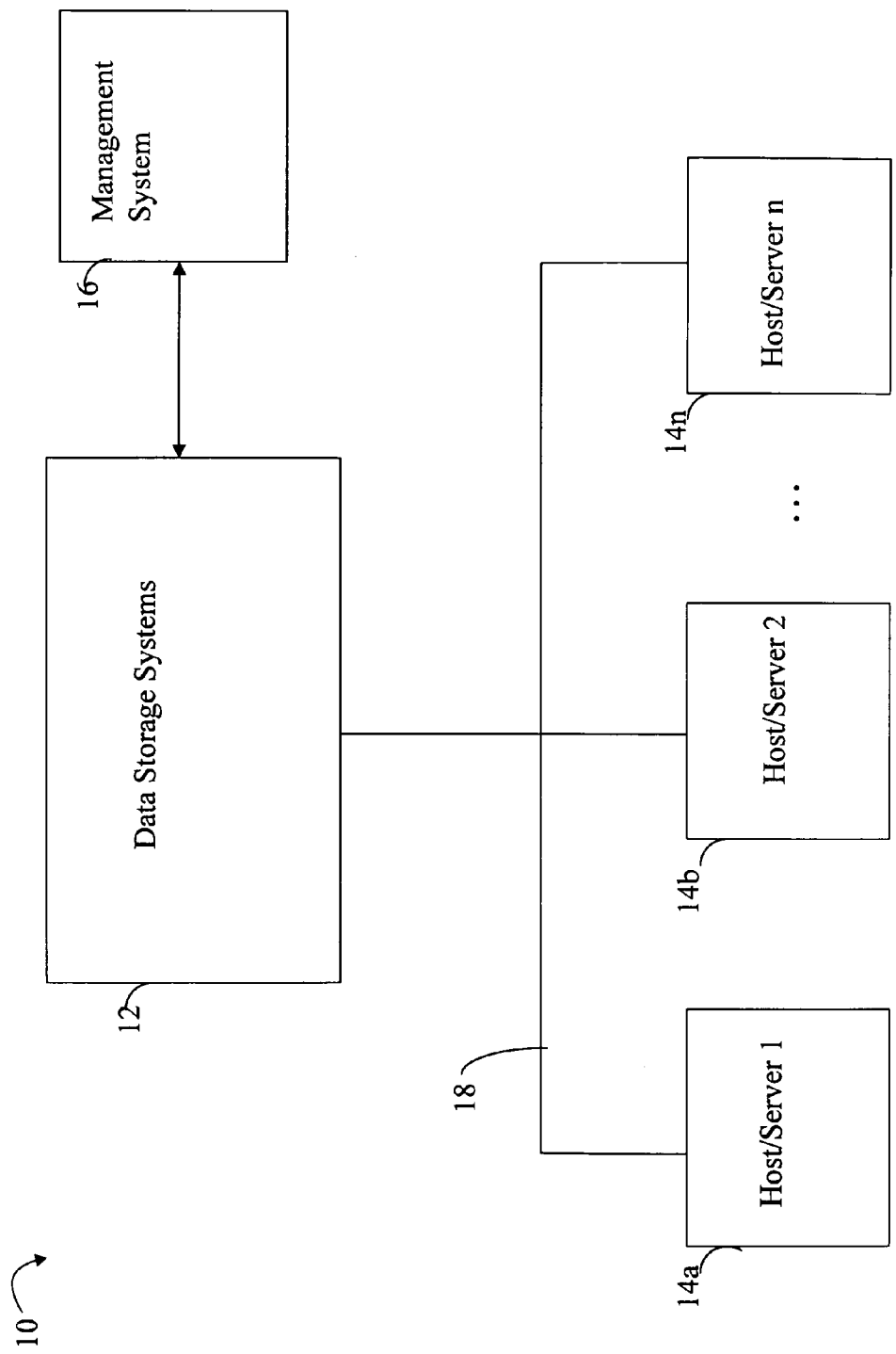
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Referring to FIG. 2, shown is an example of components that may be executing on a processor node of a data storage system. If a data storage system has multiple processors, FIG. 2 illustrates components that may be executed by each such processor and includes user mode processes 202a, 202b and 202c and module 212 executing in kernel mode.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, and 202c may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a code module using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

As will be described in following paragraphs, the API may be used to facilitate inter-module communication between two code modules executing in user mode (U-U communication), or between a first code module that executes in user mode and a second code module that executes in kernel mode (U-K and K-U communication). In following paragraphs, a first code module initiates a transaction or a command request and invokes a second code module. The first code module may also be referred to as a client and the second code module may be referred to as the server. In accordance with the techniques herein, U-U communications may be utilized when both client and server are user mode processes, U-K communications may be utilized when the client executes in user mode and the server executes in kernel mode, and K-U communications may be utilized when the client executes in kernel mode and the server executes in user mode.

It should be noted that in connection with K-K communications, both client and server execute in kernel mode and communications between such code modules may utilize local procedure calls available for communication within the same kernel container or same kernel address space and are not described herein.

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leave the implementation details of the API calls to be included in the API code. The same API may be used for U-U, U-K, and K-U communications. Described in more detail in following paragraphs are techniques that may be used in connection with U-U, U-K, and K-U communications using a same API for both the client and server independent of whether the client and server are executing in user mode or kernel mode.

Figure 2A:
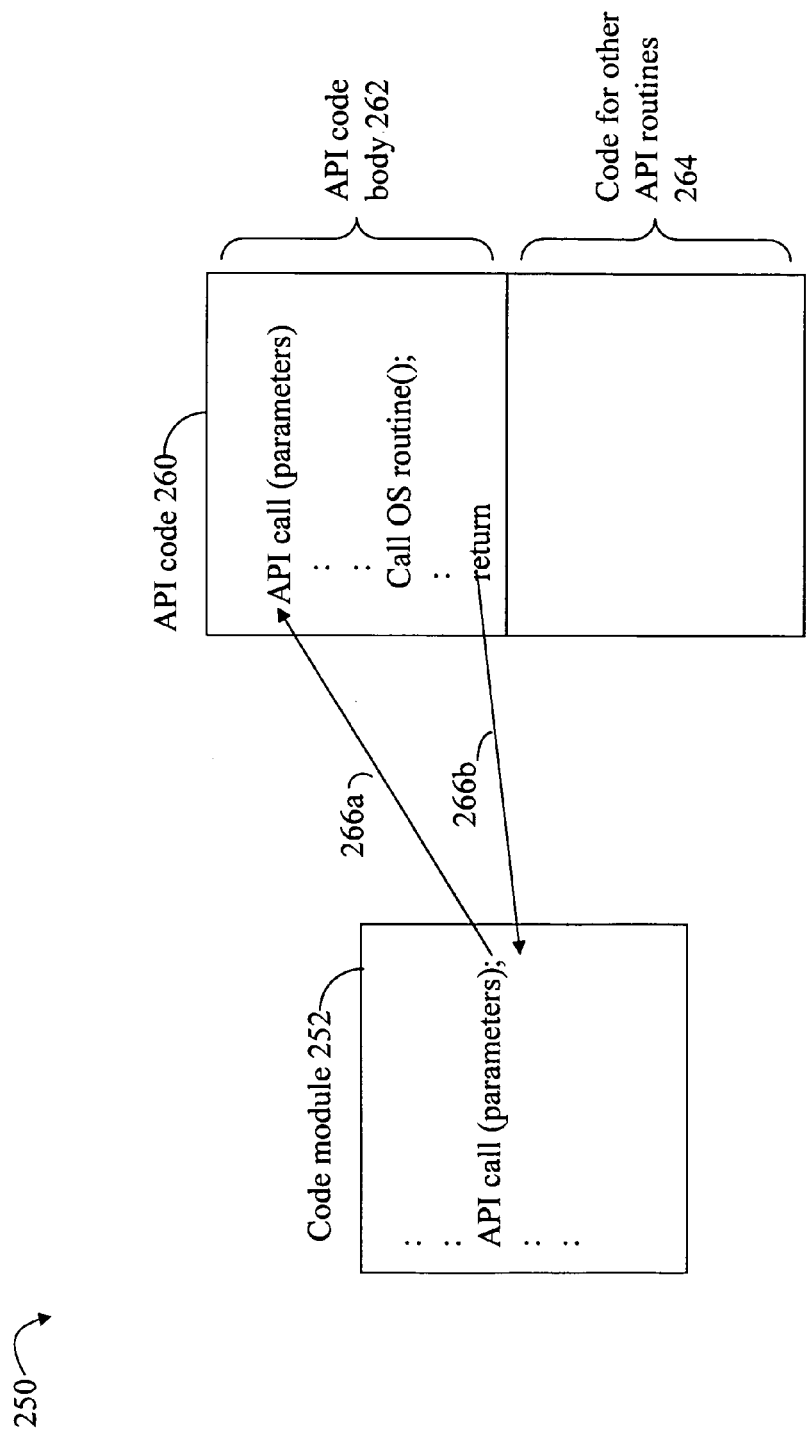
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In accordance with the techniques described herein, a same code module may be executed using a communications model and facility embodied in the API in both user space and kernel space meaning that the same set of operations are available in user space and kernel space. The inter-module communication may be performed by making calls into the API using a defined interface providing code portability across user and kernel mode in all supported environments.

Referring to FIG. 3, shown is an example of a client-side API that may be used in connection with communication between modules when the client is code that executes in user space or kernel space. The API of 280 may be used by a client in connection with issuing a command request to a server. The server may perform processing associated with the command request and transmit results back to the client. A server-side API is described in following paragraphs.

Element 282 represents the init API which may perform initialization processing. Element 284 represents the execute API which may be invoked to issue a command request for a transaction to a server. Parameters for the execute API 284 may include:

ic_id—identifies the server instance to communicate with to perform the requested command;

input-code—specifies an input processing code and may be used to indicate a particular operation or command where the server may perform many different operations;

input-buffer-base—base or starting address of the input data area;

input-buffer-len—length of the input data area;

output-buffer-base—base or starting address of the output data area; and output-buffer-len—length of output data area.

Output parameters for the execute API 284 may include:

&output-buffer-len-actual—actual size of output data area including result of processing performed by server; and &output-status-code—output status of processing performed by server.

The output parameters as indicated in 284 have values that may be determined by the server or by code on the client-side API if there are processing errors in connection with obtaining results from the server.

Additionally, one or more callbacks described in following paragraphs may be optionally specified as input parameters to the execute API. Each of the callbacks may represent an address in the client code to which control is transferred by other code of the API at various processing points. If a callback is not specified in the execute invocation, the API code may perform a default operation as will be described herein. With reference to element 284, input-prepare-callback and output-prepare-callback are callbacks invoked by the API code prior to sending the command request to the server to perform an operation. Input-post-callback and output-post-callback are callbacks invoked by the API code when the client-side API code has received notification regarding completion of the command request from the server. The input-post-callback and output-post-callback may be invoked after output or results have been obtained from the server that performed the requested operation indicated by input-code. The completion callback is invoked by the API code after input-post-callback and output-post-callback have been invoked. The callbacks and their usage is described in more detail herein.

Callbacks as used herein may be characterized as developer or user-supplied routines which are invoked at particular points in time by other code, such as code of the API. The callbacks may provide the developer with an opportunity to perform optional processing in connection with the techniques herein for intermodule communication or communication between different code execution containers as also described herein.

The completion callback is designated as having an address of the completion-callback parameter. The parameter, completion-context, specifies a completion context. During runtime, the API code may invoke the completion callback as completion-callback (completion-context) passing the completion context as a parameter when performing the completion callback. As described in more detail below, specifying the completion callback causes the execute API call to be performed asynchronously so that the completion callback is invoked after the API code has finished processing the execute API call. If the completion callback is omitted, the execute call is performed synchronously and the invoking code waits inline until the execute API call completes and returns control to the point of the execute invocation.

The input-prepare-callback routine has an address indicated by the input-prepare-callback parameter. During runtime, the API code may invoke the input-prepare callback as input-prepare-callback (input-buffer-base, input-buffer-len, input-data-area). In one embodiment described in following paragraphs, the input-data area may indicate the address in shared memory where the input data is stored for this command instance.

The output-prepare-callback routine has an address indicated by the output-prepare-callback parameter. During runtime, the API code may invoke the output-prepare callback as output-prepare-callback (output-buffer-base, output-buffer-len, output-data-area). In one embodiment described in following paragraphs, the output-data area may indicate the address in shared memory where the output data is stored for this command instance.

The input-post-callback routine has an address indicated by the input-post-callback parameter. During runtime, the API code may invoke the input-post callback as input-post-callback (input-buffer-base, input-buffer-len, input-data-area). The parameters input-buffer-base and input-buffer-len are as specified on the execute invocation. The parameter input-data area is the address of the input data area that includes the input data sent to the server.

The output-post-callback has an address indicated by the output-post-callback parameter. During runtime, the API code may invoke the output-post callback output-post-callback(output-buffer-base, output-buffer-len-actual, output-data-area). The parameter output-buffer-base is as specified on the execute invocation. The output-buffer-len actual specifies the actual length of the output data as set by the server. The parameter output-data area is the address of the output data area that includes the output data returned by the server.

Element 286 may represent the deinit API invoked at the end of processing on the client-side and may perform processing such as, for example, releasing resources used to maintain information in tracking commands and other cleanup processing.

Figure 4:
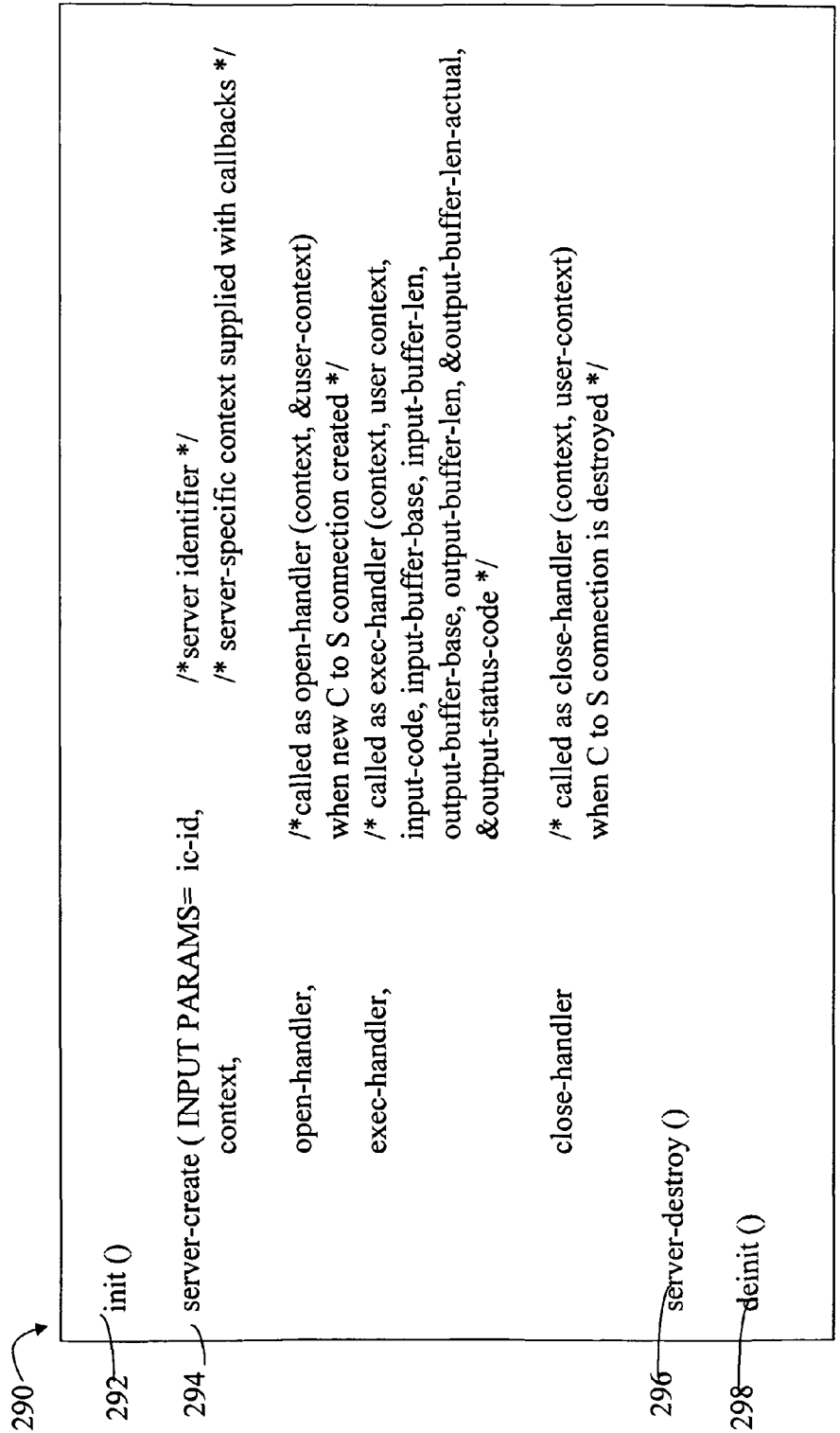
FIG. 4 is an example illustrating a server-side API for use in connection with the techniques herein.

Referring to FIG. 4, shown is an example of a server-side API that may be used in connection with communication between modules when the server is code that executes in user space or kernel space. The server-side API 290 may include the following: init 292 which performs initialization processing, server-create 294 invoked to establish a communication end point to which clients can connect and to define callbacks invoked during processing, server-destroy 296 invoked to destroy and close the connection created between any clients and the server, and deinit 298 to perform any de-initialization processing.

Input parameters of the server-create API may include:
 is-id—identifier of server to advertise or expose to clients; and
 context—indicating the client-server connection identifier. Unique for each server instance.

The open-handler, exec-handler and close-handler callbacks may be optionally specified as input parameters with a server-create invocation as indicated by 294. The open-handler callback may be invoked as open-handler (context, &user-context) when a new client to server connection is created for communication using the techniques herein. The user context may be a user-supplied value for use by the callbacks or other developer code. The user context may indicate context or information about the client-server relationship and is unique for each client-server connection or each particular client-server pair. The user context may be filled in, for example, by the open handler API and used, for example, by the exec handler and close handler to identify user data specific to each client-server pair. As will be appreciated by those skilled in the art, there may be multiple command requests in progress (e.g., as a result of multiple client-side execute requests), at a point in time. The user context, as well as in conjunction with the context parameter, may be used to identify commands associated with a particular client-server communication connection and to determine what commands have not completed in the event of a client failure.

The exec-handler callback may be invoked in response to a single command request received from the client directed to the server having the associated "ic-id". The exec-handler may be invoked as exec-handler (context, user context, input-code, input-buffer-base, input-buffer-len, output-buffer-base, output-buffer-len, &output-buffer-len-actual, &output-status-code. The exec-handler may include code to perform processing in accordance with a command request originating from a client's API execute invocation. The exec-handler may be invoked after the client-side input-prepare and output prepare callbacks. The exec-handler may read input from the location specified by input-buffer-base having a length of input-buffer-len and may store results in the location specified by output-buffer-base. The exec-handler may determine value for output-buffer-len-actual in accordance with the results so that output-buffer-len-actual indicates the actual length of the output as stored at output-buffer-base by the exec-handler. Additionally, the exec-handler may specify an output-status code indicating the results of its processing. As an example, the output-status code may indicate any one of a variety of values such as success, warning, invalid command request operation specified by input-code, and the like.

The close-handler may be invoked when the communication connection between the client and server as indicated by context is terminated or destroyed. This API may be invoked as close-handler (context, user-context).

Figure 5A:
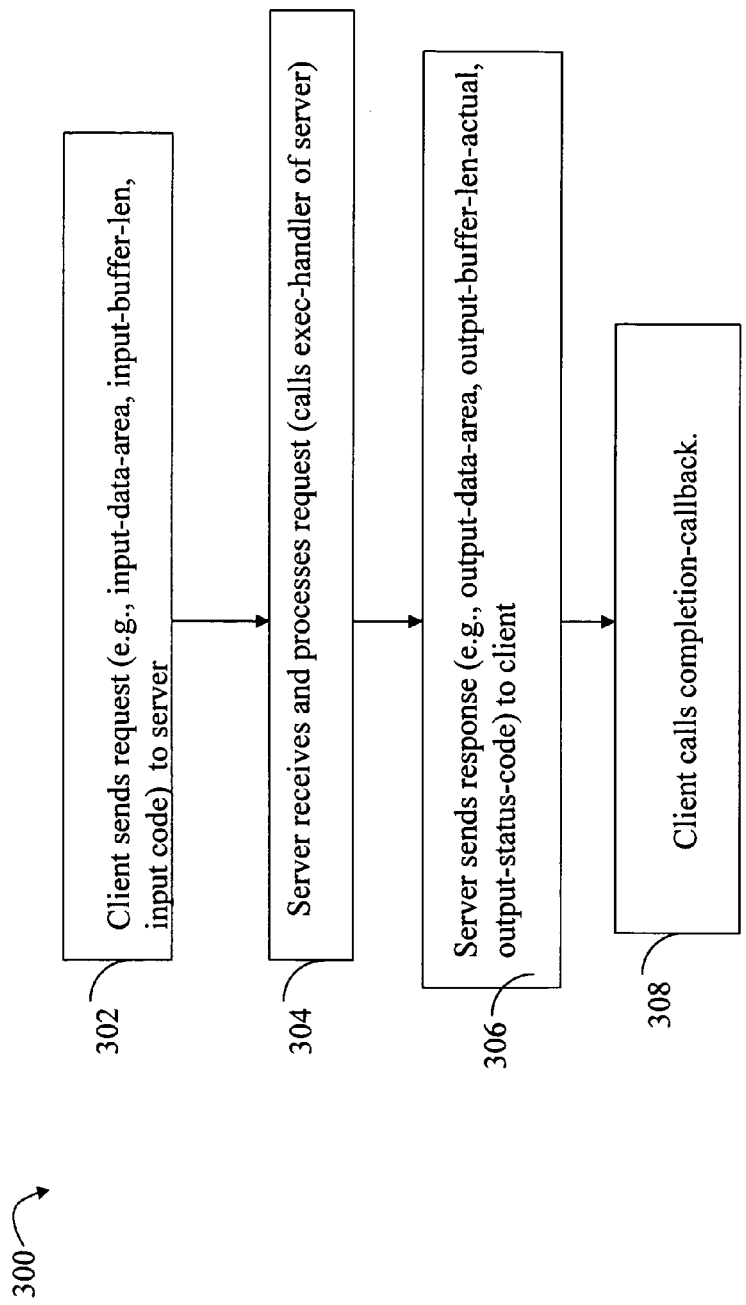
FIG. 5A is a flowchart illustrating a general message flow between client and server in connection with the techniques herein in an embodiment.

Referring to FIG. 5A, shown is a flowchart of processing that may be performed in an embodiment in connection with the techniques herein. The flowchart 300 illustrates the general processing and message flow between the client and server in connection with the U-U, U-K and K-U communication cases. At step 302, a client sends a request to the server. The request is in the form of a command as will be described herein and includes information in the input data area as well as values for the input-buffer-len and input code. The foregoing may be included in the command sent from the client to the server. At step 304, the server receives and processes the request. To process the request, the server invokes the exec-handler of the server-create API. At step 306, the server sends a response to the client. The response may include the processing results. The processing results may include information in the output data area as well as values for the output-buffer-len-actual and output-status-code. At step 308, the client calls the completion-callback.

Figure 5B:
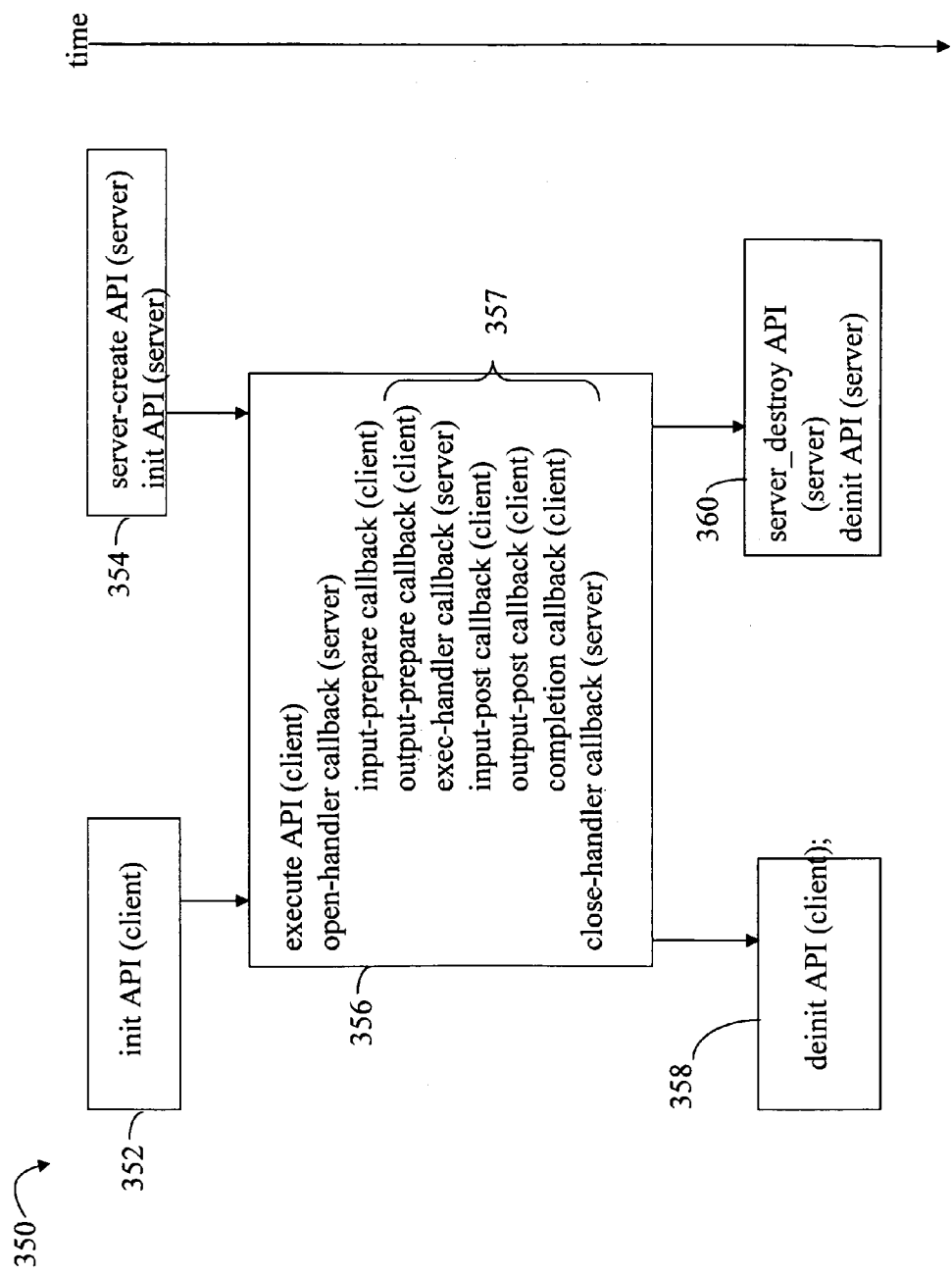
FIG. 5B is an example illustrating execution order dependencies in an embodiment using the techniques herein.

Referring to FIG. 5B, shown is a flow diagram illustrating in more detail the general flow between the client and server denoting order execution or runtime dependencies. In the example 350, the steps of 356 occur in the order indicated after processing of 352 and 354 have completed. Processing of 358 and 360 occur in order after processing of 356. Elements 352 and 354, respectively, indicate that the client init API, server init API, and server-create API (client) may be invoked prior to processing of element 356. Element 356 indicates the following order of invocation: open-handler callback (server), input-prepare callback (client), output-prepare callback (client), exec-handler callback (server), input-post callback (client), output-post callback (client), completion callback (client), followed by the close-handler callback (server). Element 358 indicates that the deinit client API is invoked after processing of 356. Element 360 indicates that the server-destroy and deinit APIs of the server are invoked after processing of 356.

It should be noted that element 356 indicates processing that may be performed for a single execute API invocation made from the client. As will be appreciated by those skilled in the art, the client may perform more than one execute API call invocation so that each second and subsequent execute API invocation results in additional invocations of 357.

In accordance with the techniques herein using the foregoing callbacks that may be specified with the client-side API, the user or developer code invoking the execute API may choose not to supply any valid data at the location input-buffer-base on invocation of the execute API. The input-prepare-callback may perform processing to obtain the actual input data and/or prepare and place the input data in a format to be processed by the server at the location specified by input-data-area. As another use of the techniques herein, the user or developer code invoking the API may supply data in one format at the address input-buffer-base on invocation of the execute API. Later on, the input-prepare-callback may be invoked to perform processing to obtain additional data and/or place the input data in a format to be processed by the server at the location specified by input-data-area. In either instance, the use of the input-prepare-callback provides the user or developer code with the opportunity to not have to specify the input data which will be processed by the server at the point of the execute API invocation. Similarly, the output-prepare-callback may perform processing prior to issuing the server command request to perform processing. The output-prepare-callback may, for example, perform processing to format or initialize the output-data-area (the location at which the server will place the command results) prior to sending the command request to the server for processing (e.g., prior to invoking the execute-handler server-side callback of the server-create API). The input-post-callback and output-post-callback provide the client-side user or developer code with the opportunity to process the results of the requested command. The results may be included in the output data area with corresponding values for output-buffer-len-actual and output-status-code in accordance with the processing results. The completion callback may be invoked after the input-post and output-post callbacks. The completion callback may also be invoked subsequent to incomplete or erroneous processing on the server-side (e.g., server side termination for U-U or K-U case).

In one embodiment, if the input-prepare client-side callback is omitted from the execute API invocation, API code may perform processing to copy an amount of data indicated by input-buffer-len from the location indicated by input-buffer-base to the location indicated by input-data-area. If the output-post client-side callback is omitted from the execute API invocation, API code may perform processing to copy an amount of data indicated by output-len-actual from the location indicated by output-data-area to the location indicated by output-buffer-base. If a completion callback is specified, the execute API invocation is performed asynchronously with respect to the developer or user code including the execute API invocation. In other words, if the completion callback is specified, the user code module thread including the execute API call continues executing while processing of the execute API proceeds. With asynchronous processing, at some point after the execute API invocation, the completion callback is invoked. If no completion callback is specified, a synchronous version of the execute API is indicated so that the user or developer code module calling the execute API waits inline for control to return from the execute API prior to proceeding.

Figure 6A:
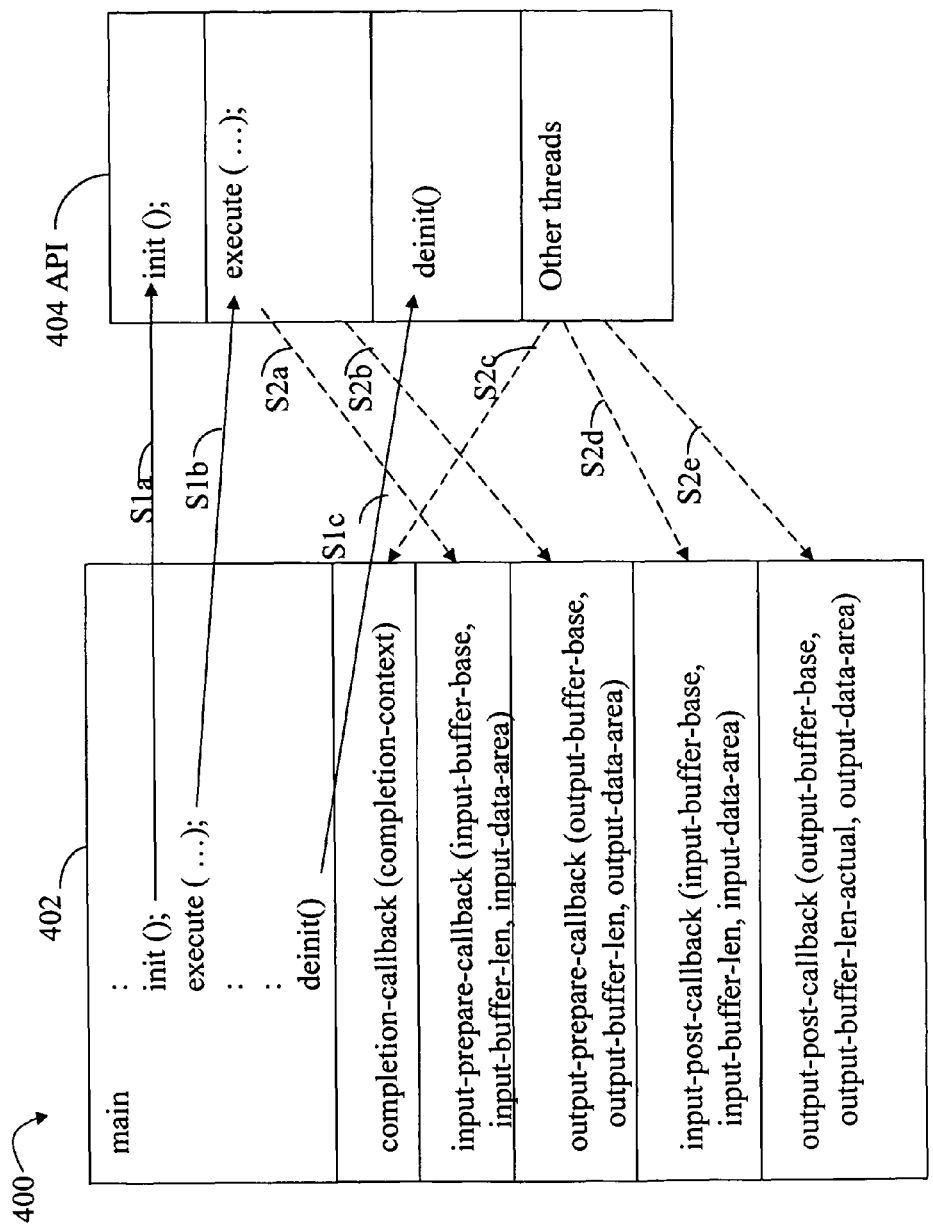
FIGS. 6A and 6B are examples illustrating interaction between developer code and code for an API (application programming interface) in an embodiment using the techniques herein.

Referring to FIG. 6A, shown is an example illustrating interactions between code of the API and a client module invoking the API in one embodiment using the techniques herein. The example 400 includes a code module 402 which makes calls into the API code 404. Arrows S1a, S1b and S1c indicate points in the module 402 at which API calls are made and control is transferred to the API 404. Dashed arrows S2a, S2b, S2c, S2d, and S2e are examples of points at which the API may transfer control to the code module 402 in connection with specified callbacks. It should be noted that, as indicated by S2c, S2d and S2e, the callbacks input-post, output-post and completion may be invoked from other threads as will be described in more detail in following paragraphs.

Figure 6B:
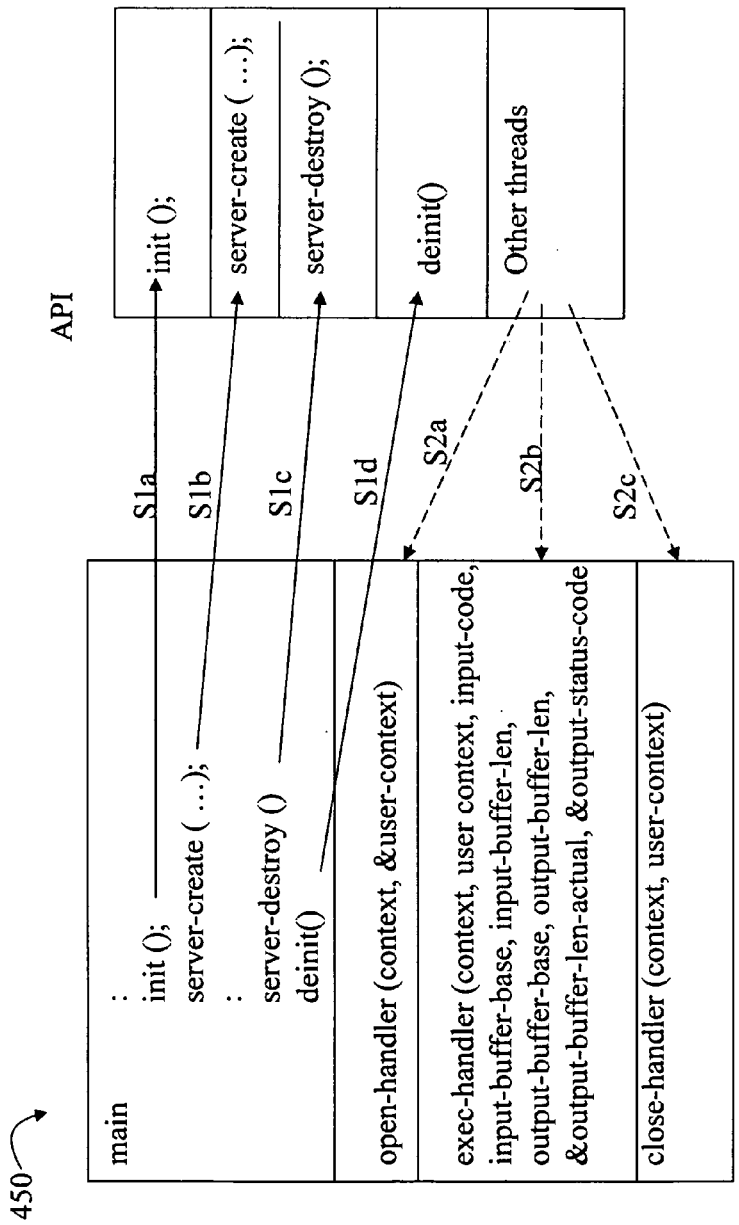

Referring to FIG. 6B, shown is an example illustrating interactions between code of the API and a server module invoking the API in one embodiment using the techniques herein. The example 450 includes a code module 452 which makes calls into the API code 454. Arrows S1a, S1b, S1c and S1d indicate points in the module 452 at which API calls are made and control is transferred to the API 454. Dashed arrows S2a, S2b, and S2c are examples of points at which the API may transfer control to the code module 452 in connection with specified callbacks. It should be noted that, as indicated by S2a, S2b and S2c, the callbacks may be invoked from other threads as will be described in more detail in following paragraphs.

What will now be described in more detail are the mechanisms that may be used in an embodiment in connection with performing U-U communications, U-K communications, and K-U communications. The U-U case will first be described.

In the U-U communication case, the API may implement the U-U module communication using shared memory (SHM), shared memory FIFOs (SHM FIFOs), and a pipe.

Figure 6C:
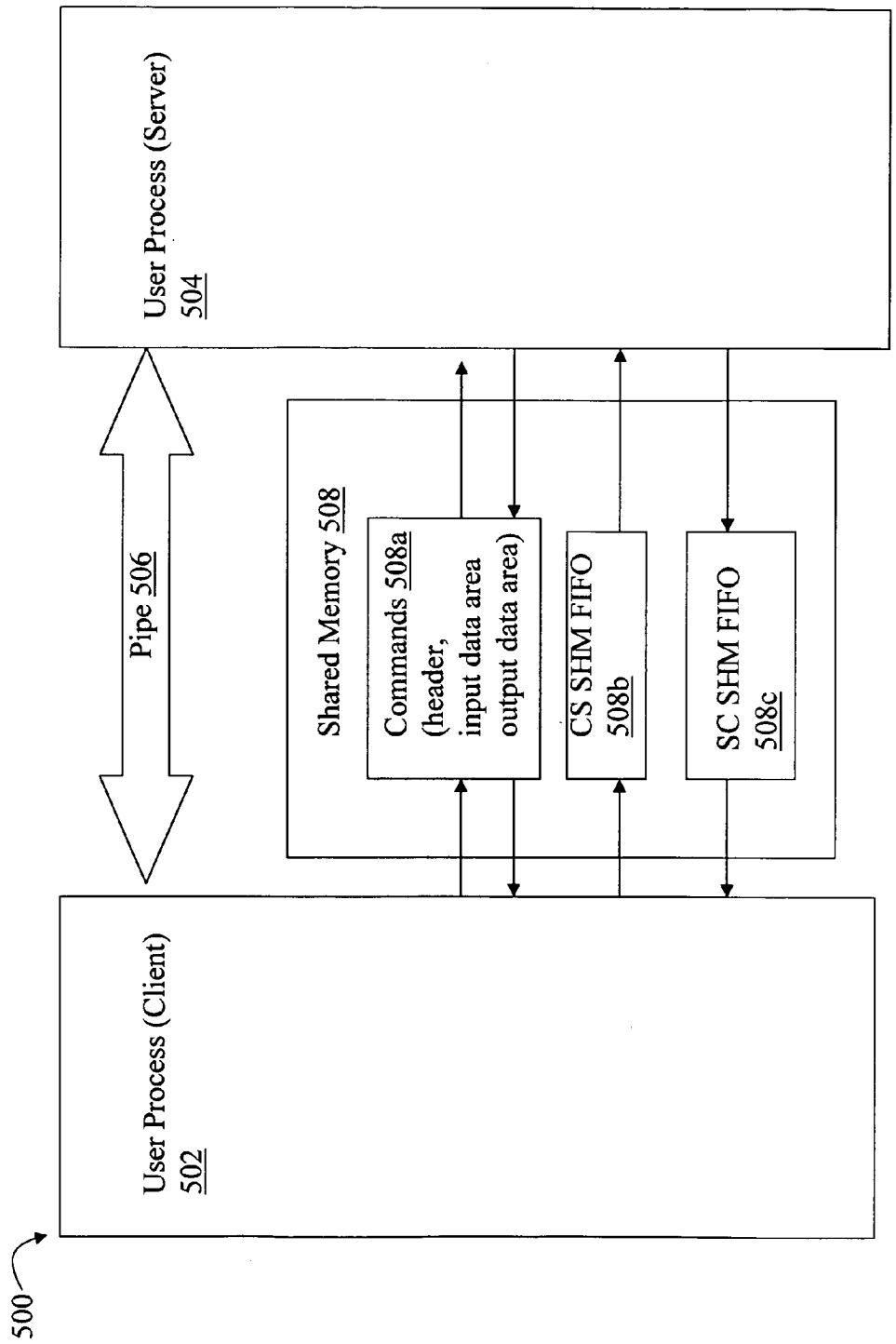
FIG. 6C is an example illustrating resources that may be used in connection with U-U (user space to user space) communications in an embodiment using the techniques herein.

Referring to FIG. 6C, shown is an example illustrating U-U communications in an embodiment using the techniques herein. The example 500 includes a client user space process (user process) 502, a server user-space process (user process) 504, a pipe 506, and shared memory 508. The pipe 506 may be implemented using operating system calls and functionality that may vary with embodiment. A pipe may generally be characterized as a logical connection between two endpoints that may be used for bidirectional communication. In one embodiment, a pipe may be created using a system call which returns a read and write file descriptor that may be used, respectively, to read from and write to the pipe. How a pipe is implemented may vary with the underlying operating system.

The shared memory 508 may represent a portion of memory that is accessible to both 502 and 504. The shared memory 508 may include a chunk or portion 508a of one or more command slots holding one or more commands, and two shared memory FIFOs—CS SHM FIFO 508b (used for sending information from the client to the server) and SC SHM FIFO 508c (used for sending information from the server to the client). Element 508a may represent a portion of the shared memory including one or more command slots, each slot or entry may hold one command data block. Each command data block may include information for a single client request or command. As will be described below, each command may include a header, input data area, and output data area.

Each of SHM FIFOs 508b and 508c may be shared memory FIFOs which use shared memory to implement a first-in-first-out (FIFO) data structure. In connection with a first normal processing mode, the client 502 may allocate a slot from 508a and store the data for a command in the slot. The client 502 may then communicate the offset or location in 508a at which the command slot is located over 508b to the server 504. The server 504 may receive the offset using 508b and then retrieve the data from the location in 508a. The server 504 may perform processing in accordance with the command by retrieving data from the input data area and header, processing data from the input data area, and storing the results in the output data area and values in the header related to the processing results. The server 504 may communicate the offset or location in 508a at which the command slot is located over 508c to the client 502. The client 502 may receive the offset sent over 508c and then retrieve data from the location in 508a. The data retrieved may include data from the output data area and other output parameter values stored in the header portion of the command slot. The shared memory 508a may be used to reduce the amount of data copying when communicating between 502 and 504. With each of the FIFO structures 508b and 508c, a sender places one or more messages in the FIFO structure and the one or more messages are retrieved by the receiver in the same order in which they were placed in the structure by the sender. Using the input-prepare callback, an embodiment may have the client process gather and collect the input data and put it into the input data area of the command slot in 508a. The API code of 502 may also place information, such as input parameters, into the header portion of the command slot. The location of the command slot may be communicated from 502 to 504 using 508b. Subsequently, the server 504 may place the results in the output data area and communicate the location of the command slot including the output data area to the client 502. The API code of the server 504 may also update output parameter values that may be included in the header portion of the command. In one embodiment, the location of the command slot in 508a may be indicated by a 4-byte message sent from a sender to a receiver.

For U-U communications in connection with techniques herein, the pipe 506 may be used for termination detection occurring when the client or server terminates. If one of the client or server terminates, the other may receive notification by specifying a registered handler. Upon termination of the client or server user process, an error condition is generated and the registered handler of the other is invoked. The registered handler may then perform any desired processing, such as cleanup processing, as will be described in more detail.

As a variation to the foregoing, the pipe 506 may be used in connection with a backup mode for processing commands between the client and server. The pipe 506 may be used as an alternative to the shared memory 508 (e.g., alternative to using 508a, 508b, and 508c) for sending command data from 502 to 504 and from 504 to 502. The alternative backup mode may be used if there are problems in connection with utilizing shared memory. Such problems may include, for example, failure to allocate a command slot from 508a because there are no available slots as may occur when there are too many commands in progress (e.g. outstanding commands being serviced by the server). In one embodiment, when the pipe is used as the backup command path, all data associated with the command (e.g., information from the header, input data area and output data area) may be sent from the client to the server, and also from the server to the client. An embodiment may also select to send only portions of the command data from the client to the server and server to the client. For example, an embodiment may select to send the contents of the output data area and header to the client from the server omitting the contents of the input data area.

What will now be described in more detail are processing steps that may be performed by the client-side in connection with the U-U communications.

Figure 7:
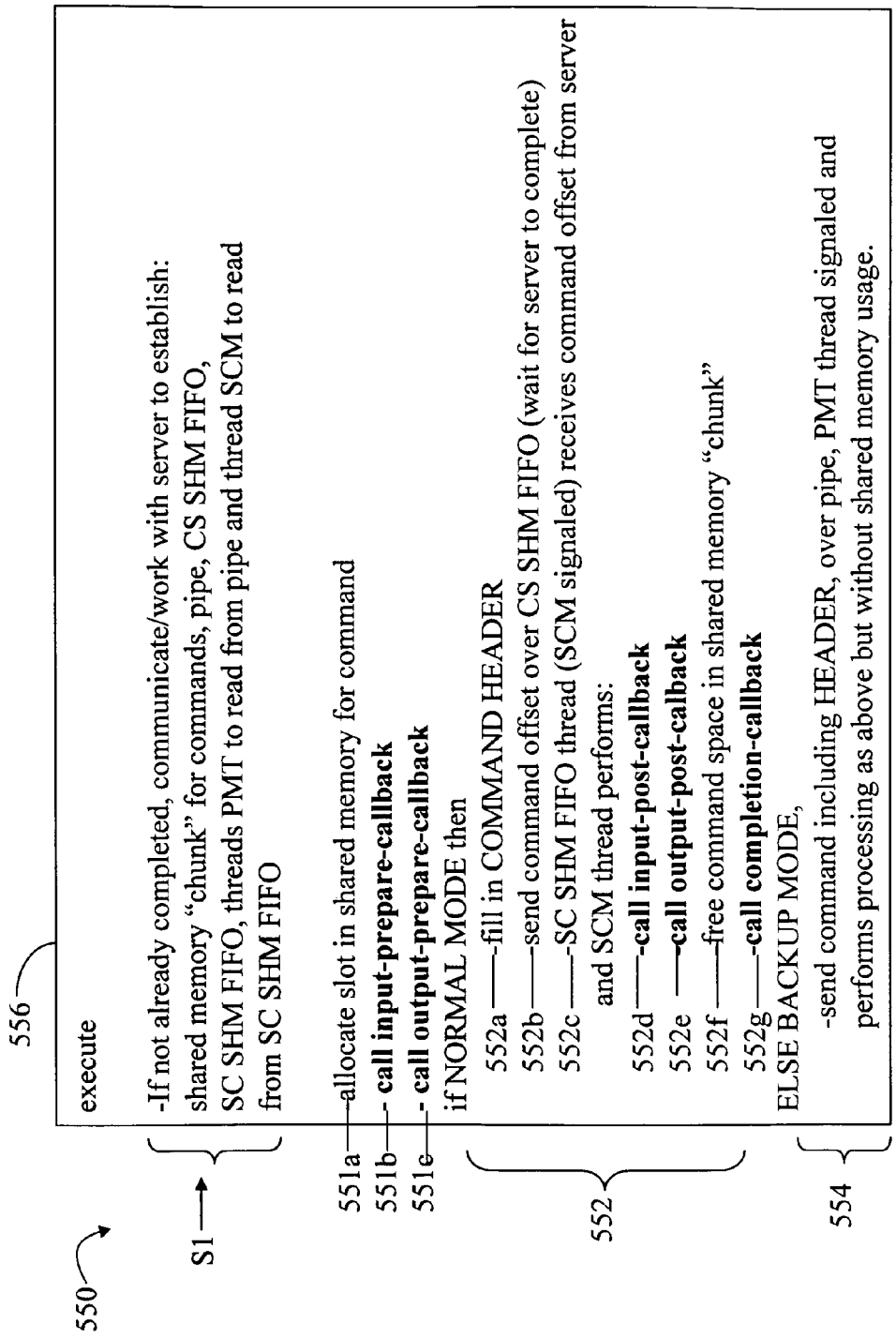

Referring to FIG. 7, shown is an example of logical processing steps that may be performed by code of the execute API (client) in an embodiment using the techniques herein. Element 556 includes a portion S1 which indicates processing that may be performed by the client to establish the necessary mechanisms or resources for communications between the client and server in the U-U case. Step S1 processing may be performed the first time the execute API is invoked with respect to a particular communication connection between a client and server Step S1 processing may occur, for example, as part of processing for a first execute command that is one of multiple execute commands performed for a particular client-server connection or pair. Step S1 is described in more detail below and includes: allocating a shared memory "chunk" or partition to hold data for one or more commands (e.g., one or more command data slots), establishing the SC SHM FIFO and CS SHM FIFO, creating thread PMT to read from the pipe and thread SCM to read from the SC SHM FIFO. In connection with techniques herein, the PMT thread may be registered and invoked to read data sent to the client over the pipe. The SCM thread may be registered and invoked to read from the SC SHM FIFO.

Once S1 processing has completed, a slot may be allocated from the shared memory chunk in step 551a for use with the current invocation instance of execute. In step 551b, the input-prepare callback is invoked. In step 551c, the output-prepare callback is invoked. If the callbacks are not specified, the API code 556 may perform other default processing as described herein. Different processing may be performed by 556 in accordance with whether normal processing mode or the backup processing mode is in effect. As described herein with reference to FIG. 6C, the normal processing mode may use 508a, 508b and 508c to communicate command data between 502 and 504 (bi directional). The pipe 506 may be used for termination detection. In the backup mode, 508 is not used and the pipe 506 is used for termination detection and also to communicate data between 502 and 504 (bi directional). If the normal processing mode is in effect, steps of 552 are performed, and otherwise steps of 554 are performed for backup processing mode using a backup data path to communicate command data between the client and server.

In connection with 552a, the command header of the allocated command slot is filled in with the parameters to be sent to the server. Step 552a may include, for example, storing the following in the command header as may be specified using the client-side API: input code, input-buffer-len, location in SHM in the command slot of input data area, location in SHM in the command slot of output data area, output-buffer-len. Other information that may be stored in the command header may include, for example, flags or other indicators as described elsewhere herein.

In connection with 552b, the offset of the command in the shared memory chunk 508a is communicated to the server over the CS SHM FIFO and the client waits for the server to complete processing the command. When the server has completed processing the command, the server sends a command offset to the client using the SC SHM FIFO. The SCM thread of the client is signaled to read the received command offset from the server in the SC SHM FIFO. The body of code of the SCM thread, as described in following paragraphs, may perform steps 552d-g to: call input-post and output-post callbacks, free the command slot in the shared memory chunk, and call the completion call back.

If the command is being processed in the backup mode as indicated by 554, the command data, including the header with the input parameters for the server, is sent over the pipe to the server. The code of 554 waits for a response from the server indicating that the server has processed the command. When the server has completed processing of the received command, the server sends a message to the client over the pipe. The message includes command data and is a response message received from the server causing the PMT thread to be signaled. The PMT thread, as described in following paragraphs, reads the received message including command data and performs processing as indicated above in steps 552d-g.

Figure 8A:
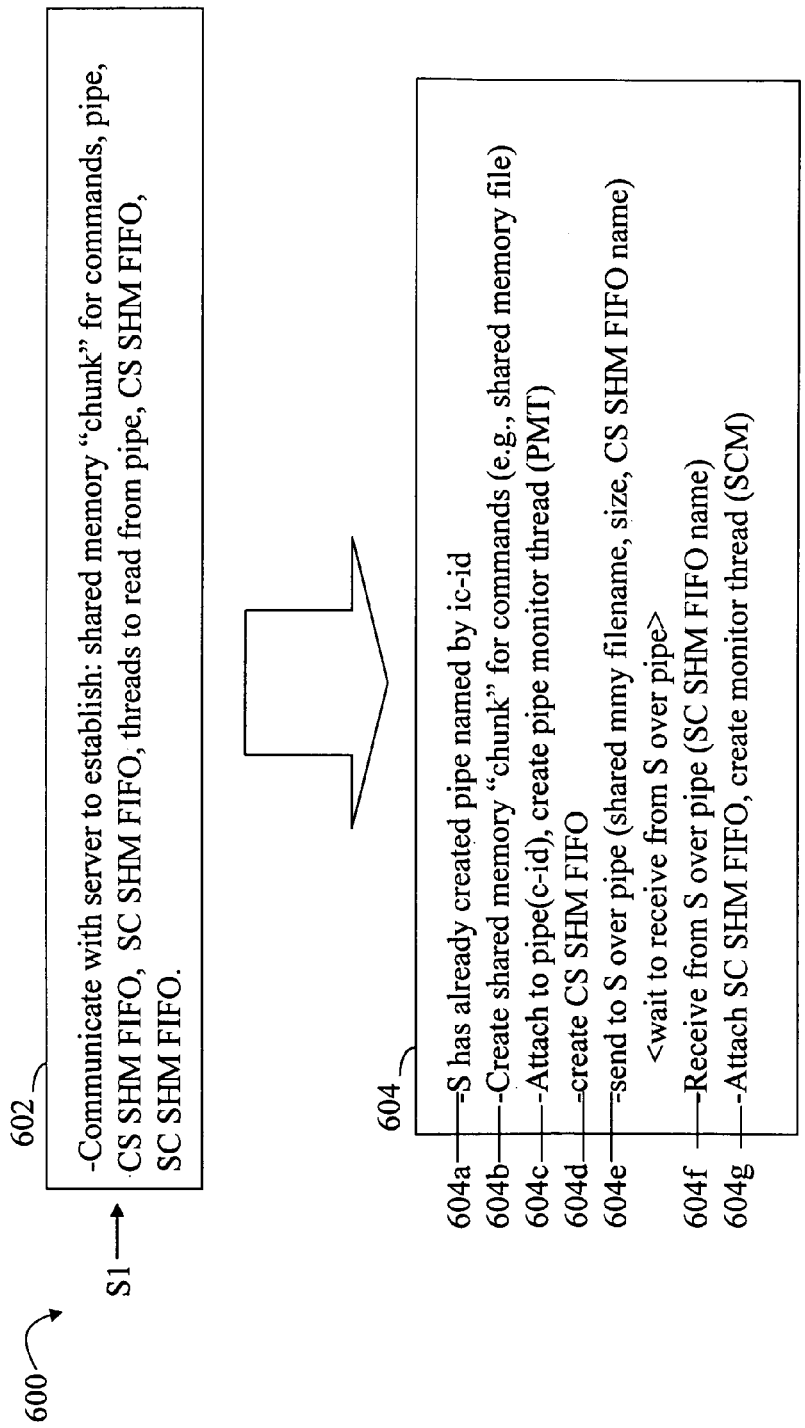

Referring to FIG. 8A, shown is an example illustrating additional details of step S1 of the client-side API that may be performed in an embodiment. Element 602 indicates the processing performed by S1 from FIG. 7. More detailed steps of S1 602 are illustrated in element 604. In step 604a, the client assumes that the server has already created a pipe identified by "ic-id", the input parameter for the client identifier for communication between the server 504 and client 502. In step 604b, the shared memory chunk is created and allocated for use with commands between the client and server. In one embodiment, the shared memory chunk may be implemented as a named shared memory file so that the same shared memory location may be mapped to the virtual address space of both the client 502 and server 504. In the embodiment using a shared memory file (may also be referred to as a memory mapped file), reads and writes with respect to the shared memory may be performed using semantics similar to that as for files yet the location which is referenced for the reads and writes is the shared memory. The way in which shared memory is accessed by the client and server may vary with embodiment. In step 604c, the client attaches to the pipe (c-id) (e.g., as referenced in step 604a). The client creates the CS SHM FIFO in step 604d. In step 604e, the client sends to the server information identifying: the shared memory chunk implemented as a shared memory file in this example, and the CS SH MFIFO created by the client in step 604d. The client waits inline to receive additional information from the server over the pipe in step 604f. The information communicated in step 604f from the server to the client enables the client to attach to the SC SHM FIFO (which is created by the server as described below). Also, as part of step 604f, the client creates the monitoring thread SCM (described below).

Figure 8B:
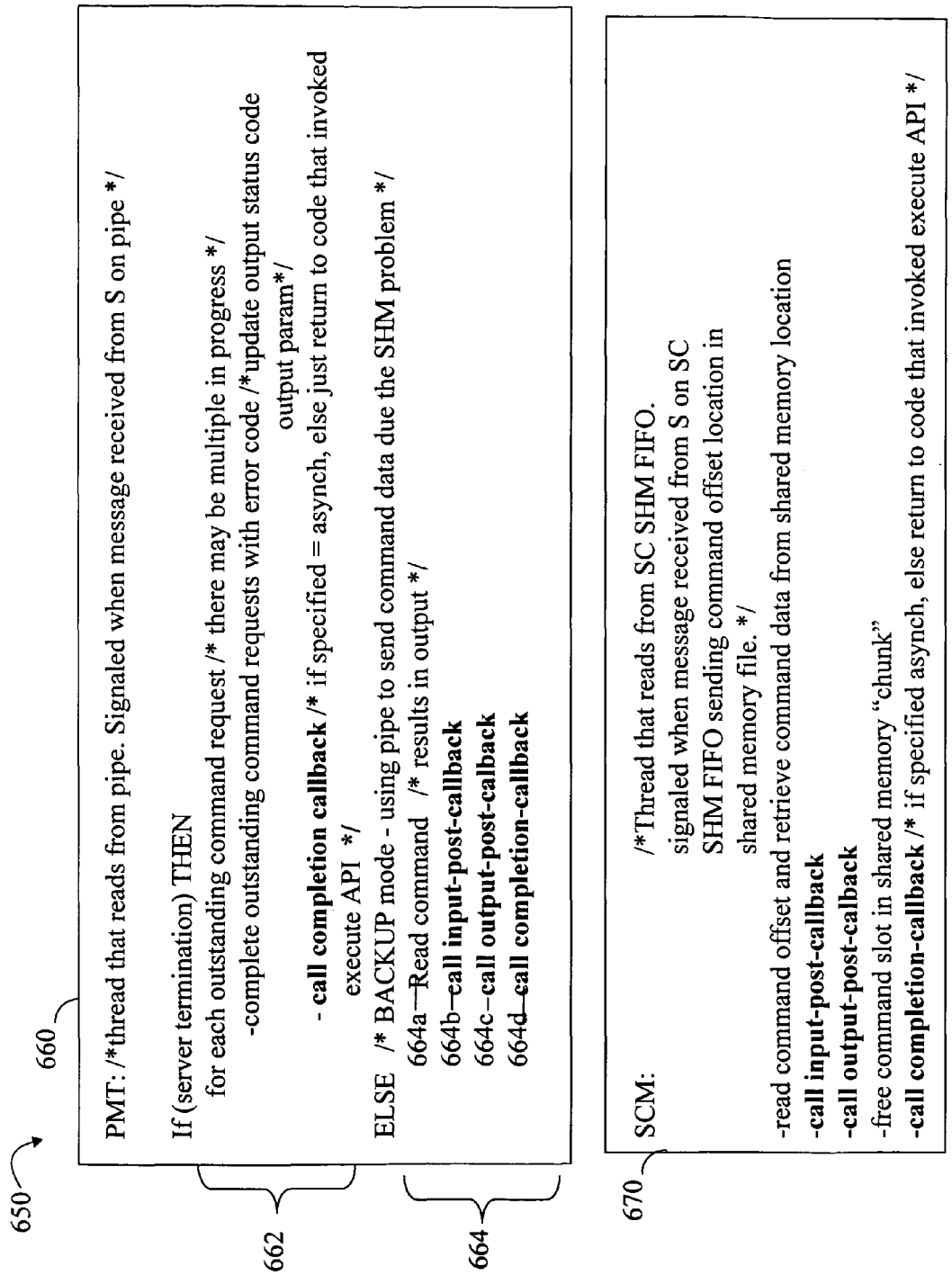

Referring to FIG. 8B, shown are additional details of threads that may be included on the client side in an embodiment. The PMT thread that reads from the pipe on the client side may perform processing as described in 660. The PMT thread may be signaled when a message is received from the server over the pipe as well as when there is a read error in connection with the pipe as may occur upon server termination. Element 662 describes processing steps that may be performed upon termination of the server where each outstanding command request is completed with an error code such as by setting the output status code return parameter accordingly. Subsequently the completion callback is invoked if specified. The client may keep track of the command requests in progress, for example, by having code of the execute API record information about each command requested prior to sending to the server. The client may, for example, keep track of the locations in shared memory at which commands are stored which are in progress or outstanding. In such an embodiment, as the command results are received from the server, the client API code may update such information to indicate that the command is no longer outstanding. Generally, the client may keep track of what command requests are sent to each server. As such, the client may perform processing, such as, tracking a list of outstanding or in progress commands when a command request is sent to a server instance and then removal of the command request from the list when notified by the server regarding completion of the command request. An embodiment may use any one or more data structures known in the art to perform the foregoing.

In connection with 664, processing may be performed using the pipe to transmit the command data when operating in backup mode such as, for example, when there is a problem with shared memory. In step 664a, the command is read from the pipe. In step 664b, the input-post callback is invoked. In step 664c, the output-post callback is invoked. In step 664d, the completion callback is invoked.

Element 670 indicates processing steps that may be performed by the SCM thread described above that reads messages (e.g., the command offsets) from the SC SHM FIFO received from the server. The SCM thread may read the command offset and retrieve the command data from the shared memory location command slot, call input-post callback, call output-post callback, free the command slot for use in connection with other commands, and the invoke the completion callback. The data retrieved from the command slot includes the information needed to populate the different parameters of the callbacks invoked by the SCM thread and may include, for example, the output-buffer-len-actual, and output status code. The foregoing may be stored in the command header portion.

What will now be described in more detail are processing steps that may be performed by the server-side in connection with the U-U communications.

Figure 9A:
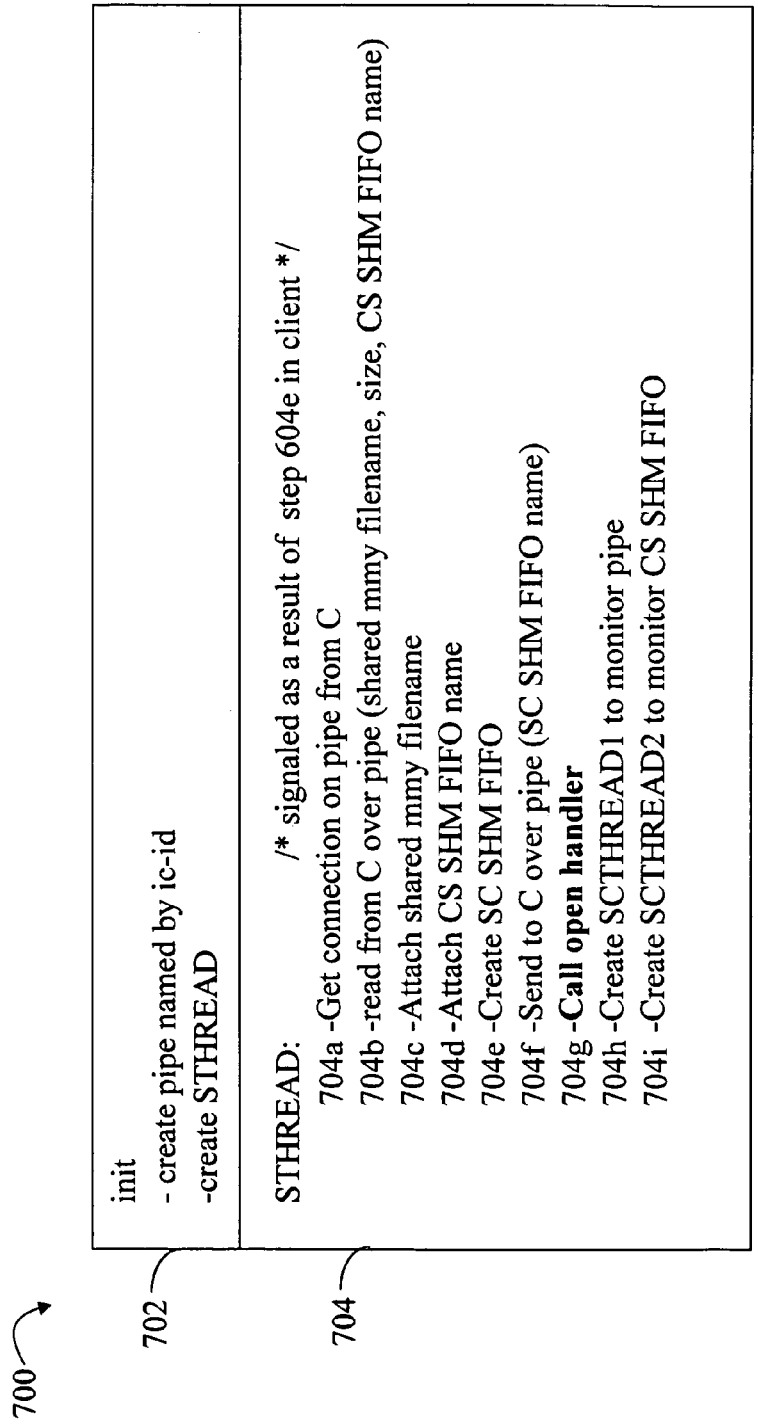

Referring to FIG. 9A, shown is an example of processing that may be performed by API code of the server for U-U communications. Element 702 represents the processing that may be performed by the server side init API to create the pipe named by "ic-id" identifying this server. Also thread STHREAD having a code body that performs the steps of 704 may be created as part of init API processing. The STHREAD may be invoked or signaled as result of performing step 604e of FIG. 8A. In step 704a, the connection to the client over the pipe is established as a result of the client performing step 604c of FIG. 8A. In step 704b, the server reads data sent from the client over the pipe identifying the shared memory chunk allocated for the command slots, and also the name of the CS SHM FIFO. In one embodiment as described herein, the information received in step 704b may related to the shared memory file to allow the server to attach to the shared memory file in step 704c. In step 704d, the server may attach to the CS SHMFIFO as created by the client using the CS SHM FIFO information communicated over the pipe and retrieved in step 704b. In step 704e, the server creates the SC SHM FIFO and sends information regarding the SC SHM FIFO to the client over the pipe in step 704f. The information communicated to the client in step 704f enables the client to attach to the SC SHM FIFO. Sending of information step 704f causes the client to resume execution in step 604f of FIG. 8A. In step 704g, the open handler is invoked. In step 704h, the thread SCTHREAD1 is created to monitor the pipe on the server side. In step 704i, the thread SCTHREAD2 is created to monitor CS SHM FIFO on the server side. Processing that may be performed by SCTHREAD1 and SCTHREAD2 is described below.

Referring to FIG. 9B, shown are processing steps that may be performed by the thread SCTHREAD1 in the server in an embodiment. SCTHREAD1 may be signaled to read messages from the pipe such as to process commands sent over the pipe when operating in backup mode. Also, SCTHREAD1 may be invoked upon termination of the client which causes a read error to occur with respect to the pipe. Element 752a indicates processing performed upon the occurrence of a termination condition where the server may perform processing to drain any command requests in progress and then invoke the close-handler. The server may track information regarding commands which are in progress for this client associated with the "context" (e.g., client-server connection identifier). For example, the server may track information regarding which commands are in progress using server-local data structures by recording information prior to invoking the exec-handler (e.g., see SCTHREAD2 processing). The information used to track commands in progress may include the offset of the command (e.g., offset of the command slot) in the shared memory. Generally, the server may track what command requests are received from each particular client instance. The code of the API may include a table or list of clients being serviced by the server. For each such client, the server may track which command requests are in progress and then remove the command requests from the list after sending a response to the particular client. The server may perform the tracking by associating a unique client identifier with each client instance issuing command requests. User or developer supplied code (e.g., the callbacks) may utilize the user-supplied user context input parameter described elsewhere herein to track requests associated with a particular client-server pairing.

Element 752b indicates processing performed when command data is sent over the pipe in connection with operating in backup mode. Element 752b processing includes reading the command data sent over the pipe, invoking the exec-handler with parameters populated from the command data, filling in values for the output-buffer-len actual and output-status-code in the command header, and send the command data back to the client on the pipe. In one embodiment, when the pipe is used, the command data sent from the client to the server may include the information in the header and the input data area. Element 752b indicates that the SCTHREAD1 may retrieve the command data and perform the processing inline, or select a worker thread to perform the processing of the command received. In one embodiment a pool of worker threads may be created, for example, as part of user process creation. A worker thread from the pool of previously created threads may be selected to process the received command. An indication as to whether the command should be performed in a FAST or INLINE mode to process a command or whether to utilize a worker thread may be indicated in the command header. For example, the command header may include a flag indicating whether to perform the command INLINE or otherwise utilize a worker thread.

Figure 9C:
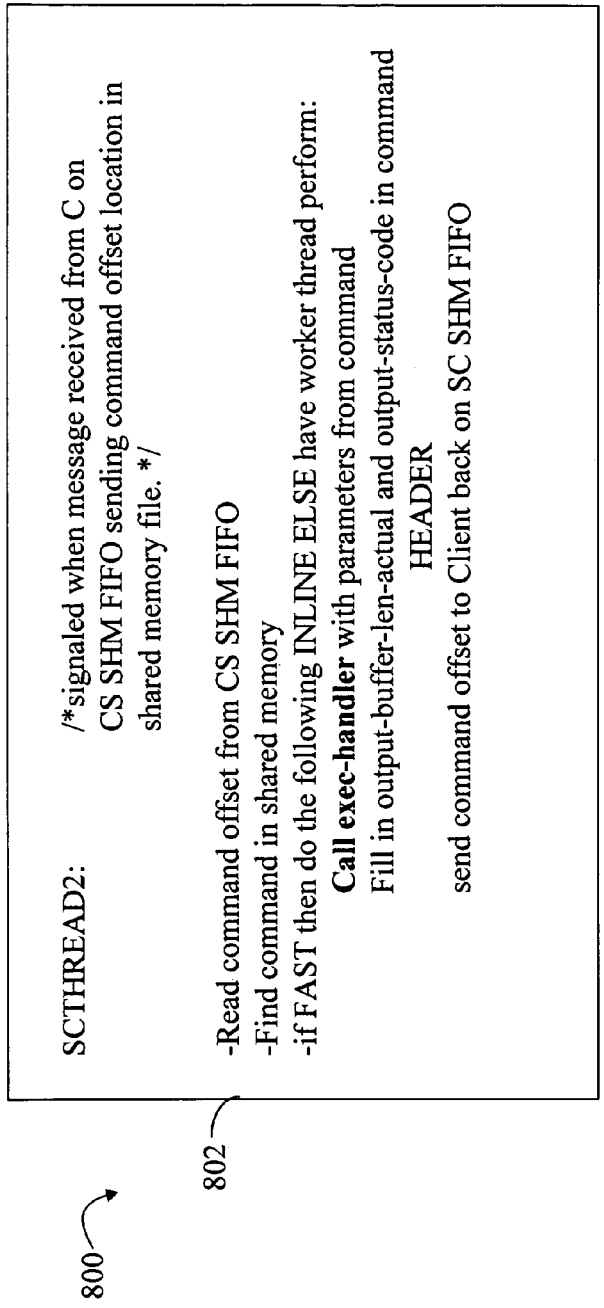

Referring to FIG. 9C, shown are processing steps that may be performed by the thread SCTHREAD2 in the server in an embodiment. SCTHREAD2 is signaled when a message is received by the server from the client on the CS SHM FIFO. The message indicates an offset location in the shared memory for the slot containing the command data. Element 802 indicates that the code body of SCTHREAD2 reads the command offset from the CS SHM FIFO, retrieves the command from the indicated shared memory location (e.g., command slot) as sent over the CS SHM FIFO, and then either processes the command inline or has a worker thread perform processing of the command. The worker thread may be selected from a pool as described elsewhere herein. The command processing may include invoking the exec-handler with the command parameters, filling in the output parameter values of output-buffer-len-actual and output-status-code in the command header, and sending the command offset back to the client over the SC SHM FIFO.

Referring back to FIG. 6C, what will now be described in more detail are the shared memory portions 508a-c.

Figure 10A:
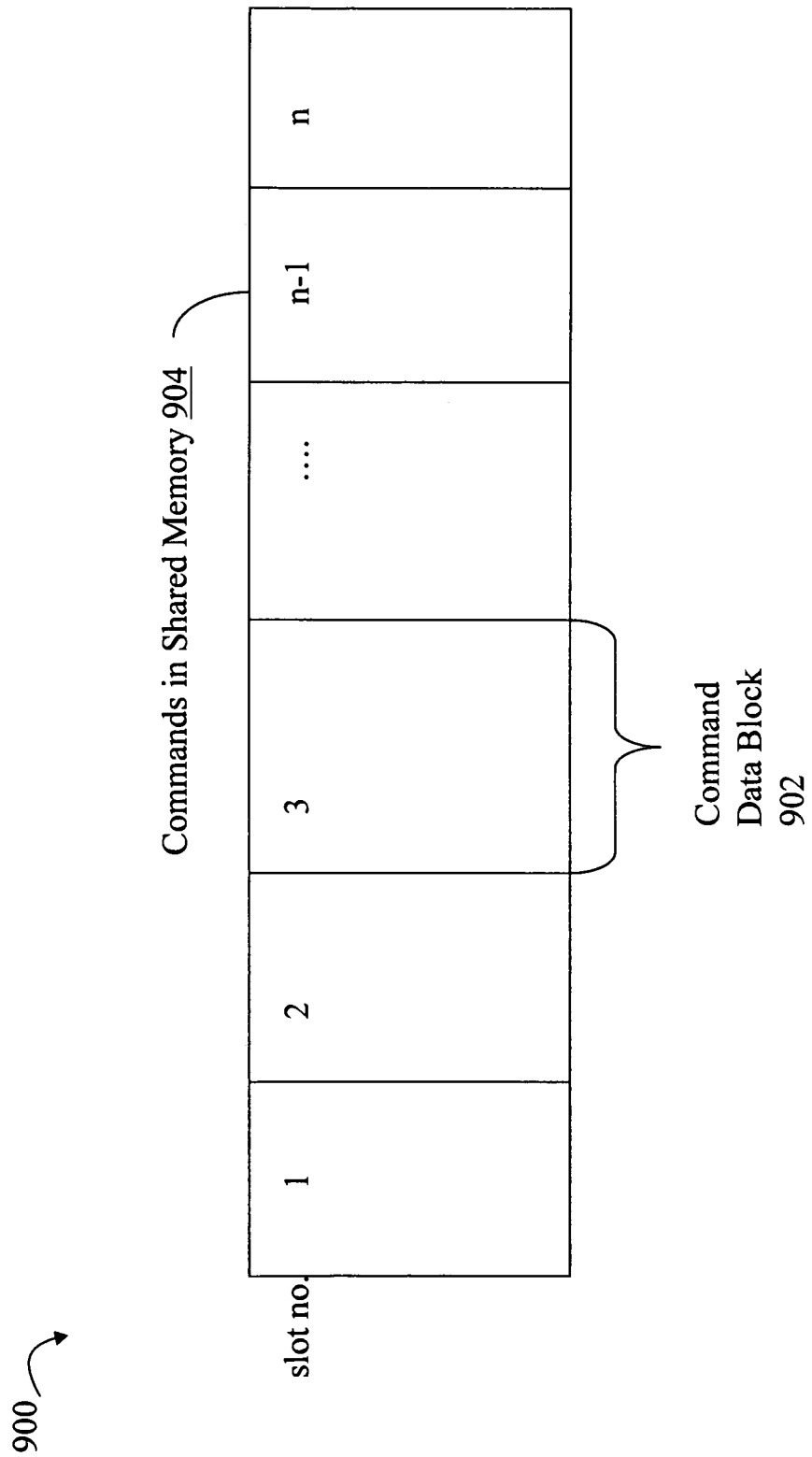
FIGS. 10A, 10B, 10C, 10D and 10E are examples illustrating data structures that may be used in an embodiment in connection with the techniques herein.

Referring to FIG. 10A, shown is an example illustrating the shared memory chunk or partition 508a created for storing the command data for one or more commands in an embodiment. Element 904 indicates the chunk or partition created by the client, such as for a shared memory file, including slots for command data. Each slot may include storage for one command data block to hold the data for a single command 902. It should be noted that the shared memory chunk 904 may be initially obtained for use in connection with the techniques herein and then portions of the chunk 904 may be further allocated for use with individual commands as needed. The command data blocks may vary in size or may be of a fixed size. It should also be noted that although the command blocks are denoted by slot numbers 1 . . . n in FIG. 10A, the slot numbers do not denote an ordering of the commands in progress since the particular commands in progress at any point in time may vary. The slot numbers denote only that the chunk 904 may be large enough to contain data for "n" commands. In an embodiment in which the size of each command data block varies, the number of slots will also vary.

Figure 10B:
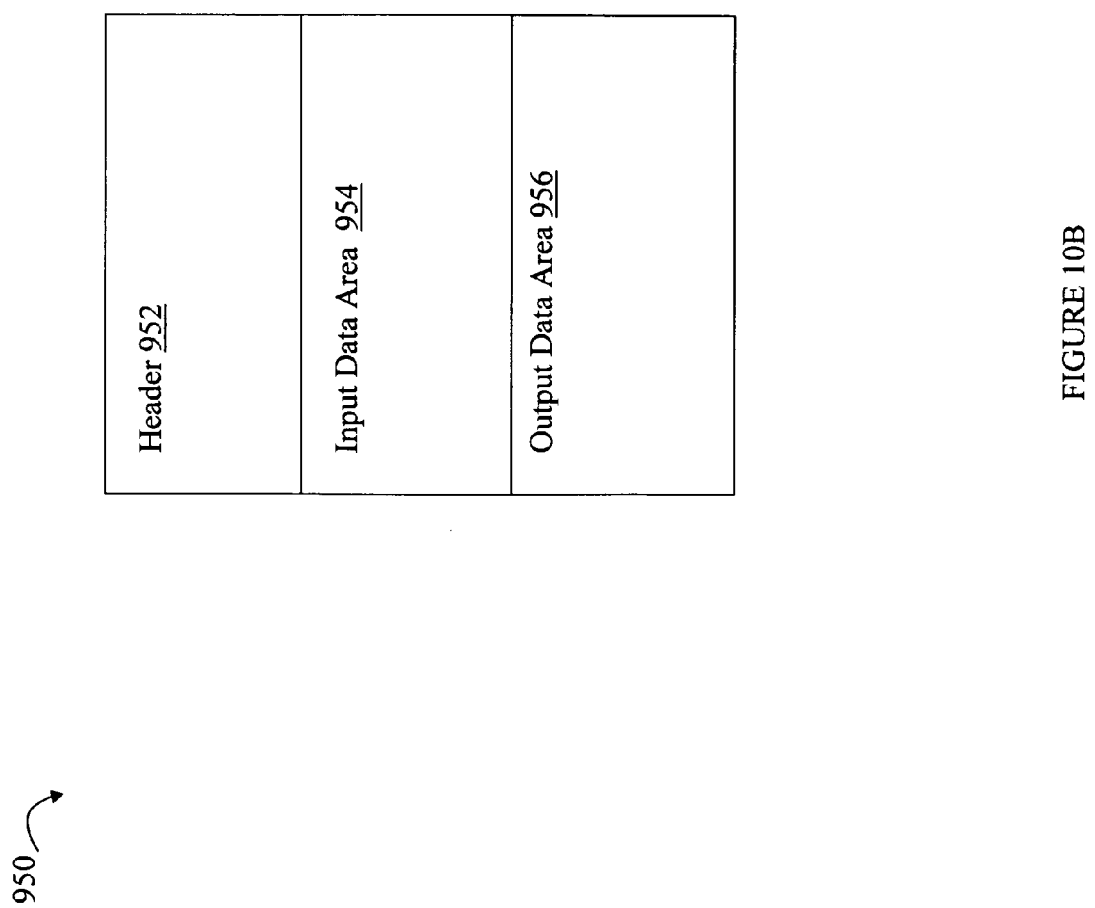

Referring to FIG. 10B, shown is an example illustrating fields that may be included in a command data block 902 of FIG. 10A in an embodiment. The example 950 illustrates the different fields that may be included in each slot for a single command. The example 950 includes a header portion 952, an input data area 954 and an output data area 956. The header portion 952 may include parameters sent to the server from the client (e.g., values for the input code, input-buffer-len), and parameters sent or returned to the client from the server (e.g., values for the output-buffer-len-actual and output-status-code. The header may also include other metadata about the command. For example, the header may include a flag indicating whether the command is to be performed inline or by a worker thread as described elsewhere herein. The foregoing flag may be set in a variety of different ways, for example, based on information of a global setting, and/or user-specified information provided per execute call instance. In this case, the execute call described herein may include another input parameter for this flag. The input data area and the output data area may have a data layout and structure as understood by the client and server and used by the callback routines that may invoked. The foregoing provides for flexibility in connection with processing that may vary with each embodiment.

The header portion 952 may include command metadata. The input data area 954 may include the input data as well as metadata describing the input data. Such input metadata included in the input data area 954 may indicate how the input data is structured in the input data area as well as attributes about the input data included therein. Similarly, the output data area 956 may include the output data as well as metadata describing the output data. Such output metadata included in the output data area 956 may indicate how the output data is structured in 956 as well as attributes about the output data included therein.

Figure 10C:
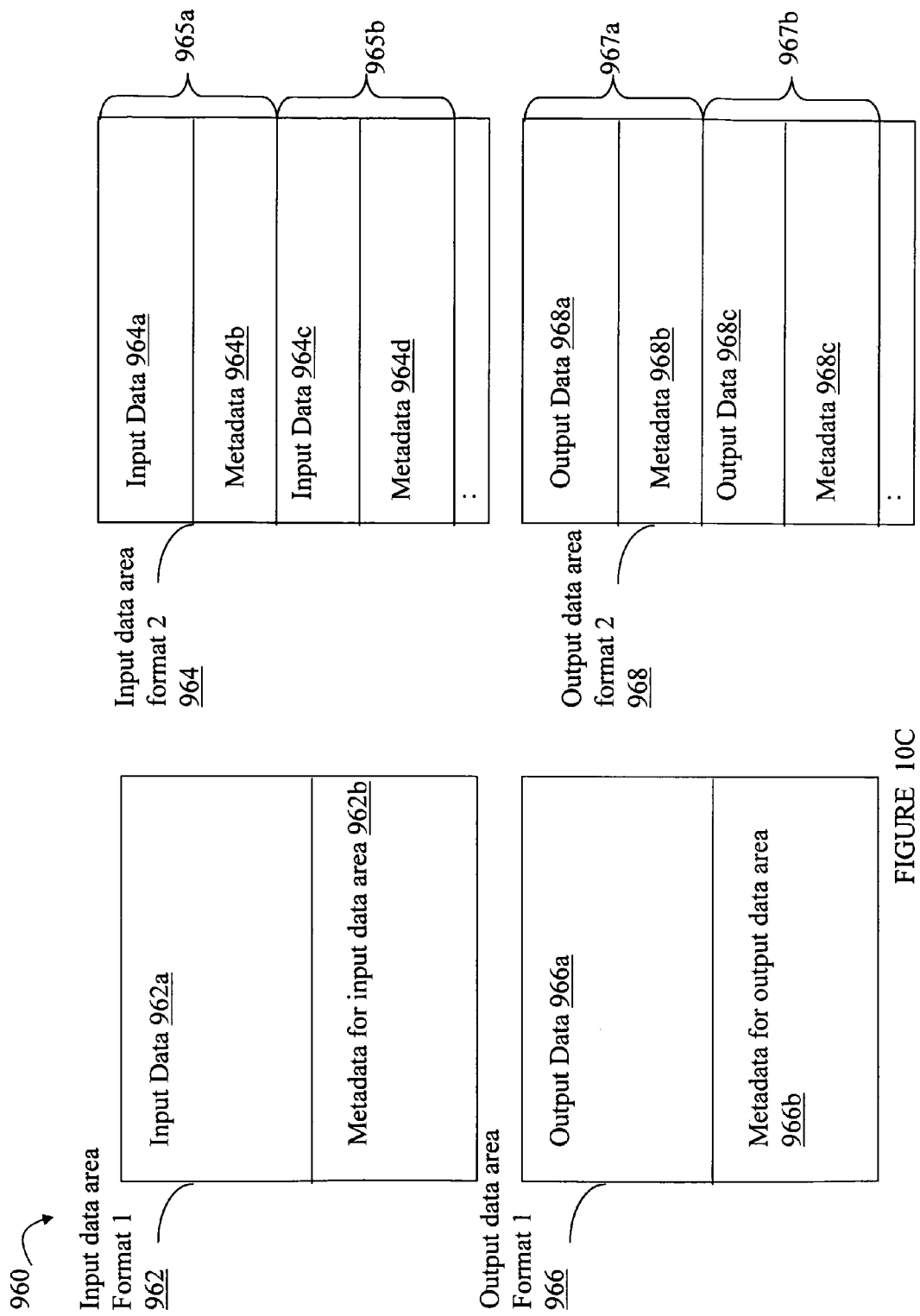

Referring to FIG. 10C, shown are examples of information that may be included in the input and output data areas and how the foregoing may be structured in an embodiment using the techniques herein. Elements 962 and 966 indicate how the input data area and the output data area may be structured in one embodiment. Element 962 indicates a first format or layout of the input data area as may be included in a command data block of a command slot. Element 962 includes a first segment 962a of the input data followed by input metadata in 962b. In this example 962, all the input data of the command may be stored as a single contiguous segment. Similarly, all the input metadata may also be stored as a single contiguous segment in 962b. The order of 962a and 962b may be reversed so that the input metadata 962b occurs prior to the input data 962a. Element 966 indicates a first format or layout of the output data area as may be included in a command data block of a command slot. Element 966 includes a first segment 966a of the output data followed by output metadata in 966b. In this example 966, all the output data of the command may be stored as a single contiguous segment. Similarly, all the output metadata may also be stored as a single contiguous segment in 966b. The order of 966a and 966b may be reversed so that the output metadata 966b occurs prior to the output data 966a.

Elements 964 and 968 collectively indicate another way in which the input and output data areas may be structured in another embodiment. In 964 and 968, the metadata segments are partitioned throughout the corresponding data areas as opposed to being stored contiguously as in 962 and 966. In the input data area format 964, each set of input data may stored with its corresponding metadata portion. Sets of input data and associated metadata are indicated by 965a and 965b. In the output data area format 968, each set of output data may stored with its corresponding metadata portion. Sets of output data and associated metadata are indicated by 967a and 967b.

The layouts or formats of the input and output data areas of a command illustrated in FIG. 10C are merely a couple of examples of different layouts and formats that may be used in an embodiment in connection with the techniques herein. The input and output data areas of the command can be structured in accordance with the developer code calling the API. The metadata that may be included in both the input and output data areas describing the respective data area layout or format may be used by callbacks to interpret the structure. For example, the output-prepare and/or output-post callback may first look at a location in the output data area expected to include output metadata to determine the structure and layout of the output data area indicating where the actual output data is stored.

Figure 10D:
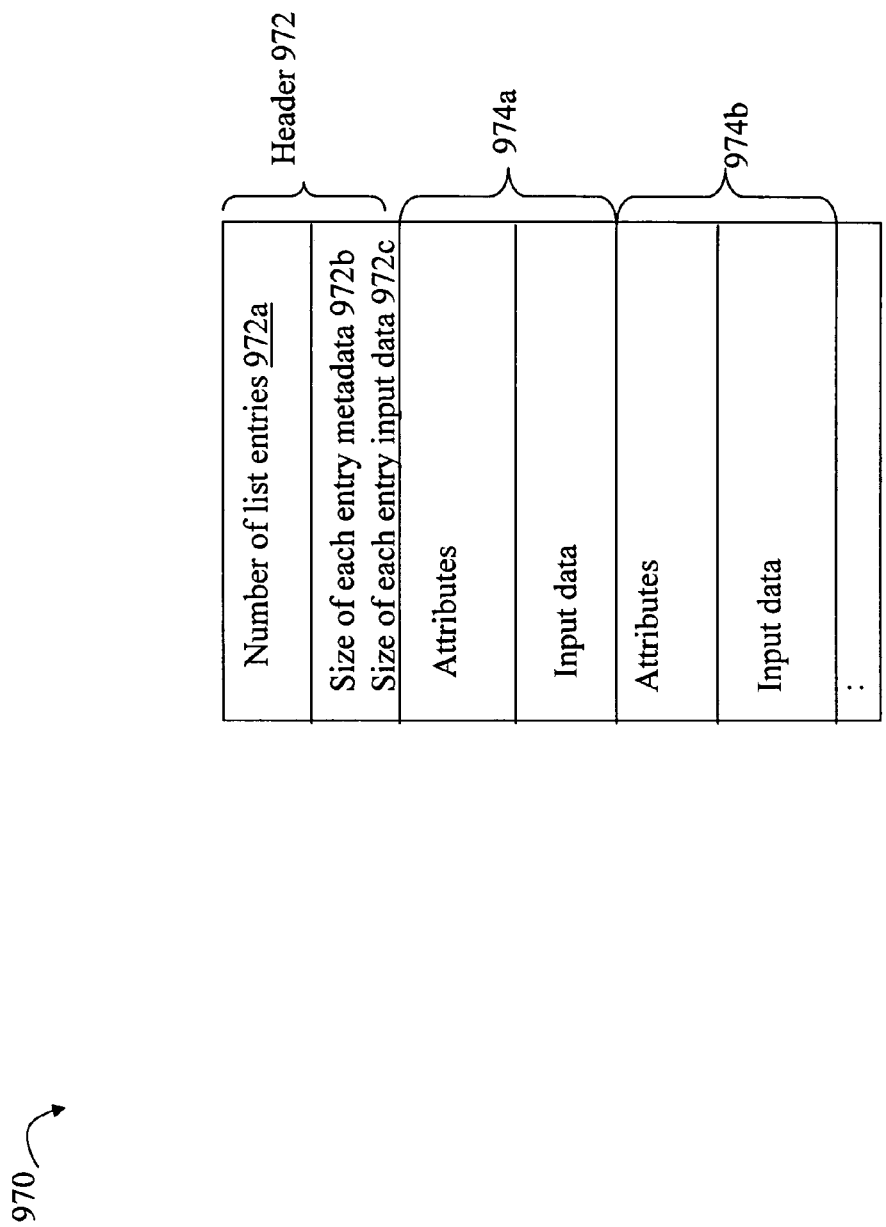

As another example, FIG. 10D includes an exemplary layout of an input data area of a command. The example 970 includes a first metadata portion corresponding to a list header element 972 with a first integer value indicating the number of entries in the list stored in the input data area 972a, a second integer value indicating a fixed size of each entry's metadata 972b, and a third integer indicated a fixed size of each list entry's corresponding input data 972c. In the example 970, the metadata of 972 may be read to determine and interpret the layout of the input data area in which each list entry has input data and corresponding metadata portions stored together at consecutive logical memory locations. Following the list header 972 are the list entries 974a, 974b, and the like. A list entry 974a includes the metadata for an entry, such as indicated by the attributes, followed by the entry's input data. In an embodiment with a command having an input data area 970, the output data area may also have a format like that of 970 or a different format as may vary with embodiment.

The callback routines input-prepare, output-prepare, input-post and output-post may perform processing in accordance with the particular format and layout of the input and output data areas. In one embodiment, one or more of the callbacks may further invoke one or more other routines to obtain the needed input data, place it in the required format for the server, and the like.

As an exemplary use of the callbacks, input-prepare callback may be invoked and the input data may be in a first format used on the client side. The server side may expect data to be in a second different format and input-prepare may perform processing to convert the data from the first format to the second format for use by the server. Similarly, results of the command processing performed by the server are expressed in accordance with the second format so that the output data area has the second format. Thus, when command results are sent from the server to the client, the output-post callback may transform the results of the output data area from the second format to the first format for use by the client. As a furtherance of the foregoing example, the input data in the first format may be stored at the location indicated by the input parameter input-buffer-base. The input-prepare callback may transform the input data stored at input-buffer-base from a first format to a second format and store the data in the appropriate shared memory location of the command prior to sending the command to the server. Alternatively, the input-prepare callback may call one or more other routines to obtain the input data in the first format. The one or more other routines may place the data in the shared memory location in the first format and then, upon return to the input-prepare callback, input-prepare may transform the input data in the shared memory location from the first format to the second format prior to sending the command to the server.

After the input data is sent to the server in the second format as described above, the server may place results in the output data area in the second format. Upon return to the client, the input-post callback may be called to transform the input data in the shared memory from the second format back to the first format as may be expected and subsequently used by other client-side code. The callback output-post may transform the result of the output data area from the second format to the first format for use on the client side.

As another example of the use of the callbacks, the callback output-prepare may be called to format or initialize the output data area as expected by the server. For example, output-prepare may initialize header of a list or place metadata in the output data area indicating how the server should store the results in the output data area. The layout of input and output data areas may be defined by the client and may be indicated using metadata in the input and output data areas. If the input-prepare and/or output-prepare callbacks are specified in a client-side execute invocation, the input parameters input-buffer-base and output-buffer-base, respectively, may initially refer to metadata used by the callbacks in populating the corresponding locations (e.g., such as in shared memory) including the command data passed to the server.

It will be appreciated by those skilled in the art that the foregoing are just a few examples illustrating the flexibility of the techniques herein as may be utilized in an embodiment.

Figure 10E:
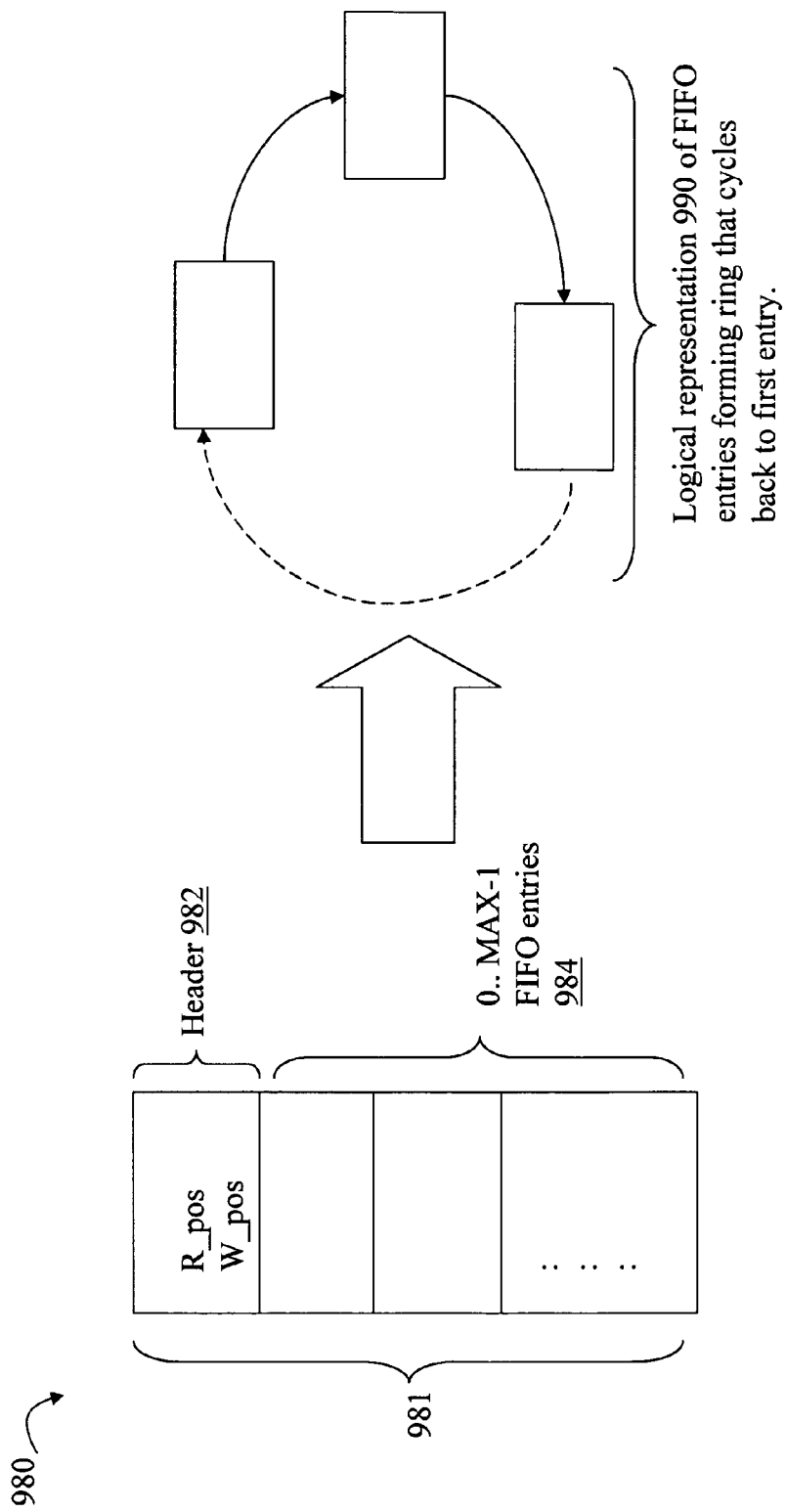

Referring to FIG. 10E, shown is an example illustrating in more detail how each of the SHM FIFOs, such as 508b and 508c, may be implemented in an embodiment. The example 980 includes a first representation of a SHM FIFO 981 that includes a header 982 followed by FIFO entries 984. Each entry of 984 may correspond to 4 bytes of storage. In one embodiment, the structure 981 may correspond to the physical layout in shared memory for the SHM FIFO. The header 982 include R_pos indicating the FIFO entry (0.MAX-1) at which the reader or message receiver is processing. W_pos indicates the FIFO entry (0.MAX-1) at which the writer or message sender is processing. Element 990 illustrates a logical representation of the FIFO entries 984 forming a ring or circular buffer such that when the last FIFO entry (entry MAX-1) of 984 is reached in processing by a reader or writer, processing cycles back to the first entry (FIFO entry 0).

Described in following paragraphs are logical steps of a Reader and a Writer that may be performed in one embodiment to utilize the shared memory FIFO structure of FIG. 10E. As an example with the CS SHM FIFO, the reader may be the server reading and processing entries from the FIFO and the writer may be the client placing entries in the queue of command offsets to be processed by the server. It should be noted that an embodiment may use a hardware primitive or instruction that may available to perform an atomic compare and swap operation or CAS. The CAS operation may described using three operands—a memory location (V), the expected old value (A), and a new value (B). The processor will atomically update the location V to the new value if the current value stored in V matches the expected old value, otherwise it will do nothing. In either case, the value that was stored in the location V prior to the CAS instruction may be returned. The CAS may be used to execute a read-modify-write sequence without fear of another thread modifying the location V in the meantime, because if another thread did modify V, the CAS would detect it (and fail) and the algorithm could retry the operation. The way in which the CAS operation is implemented may vary with embodiment.

Below is a representation of a data structure declaration that may be used with the FIFO structure. Also described below are logical steps that may be performed in an embodiment to write or put an entry into the FIFO structure. If the FIFO is full, then Writer is blocked until signaled by a reader that there is now an available entry in the FIFO structure for use by the writer. When the FIFO structure is not full, the new data is stored in the next available entry. It should be noted that an embodiment may use an atomic compare and swap operation when performing updates to R_pos and W_pos of the header of the FIFO structure.

```
struct Fifo_Body {
    int R_pos; /* current position to READ */
    int W_pos; /* current position to WRITE */
    int Entries_current; /* current count of entries in FIFO */
    int Entries_max; /* maximum count of entries in FIFO */
    int Entries[Entries_max-1]; /* array of entries */
};
Fifo_Create(struct Fifo_Body *fifo, int Entries_max) {
    fifo->R_pos=0;
    fifo->W_pos=0;
    fifo->Entries_current=0;
    fifo->Entries_max=Entries_max;
}
Fifo_Entry_Write(struct Fifo_Body *fifo, int Entry)
/* Normally the entire logic section below is interlocked against the reader.
```

The following LOCK and the subsequent UNLOCK ensure this.
In some implementations a LOCK and UNLOCK can be dispensed with if the following logic can be implemented with an ATOMIC COMPARE AND SWAP (CAS) instruction that can simultaneously update R_pos W_pos and Entries_current and determine if the update was successfully interlocked against the reader */

```
    LOCK( );
    while   ((fifo->Entries_max-fifo->Entries_current)==0)
{WAIT_ON_READER( ); }/* wait for entry to be available */
    fifo->Entries[fifo->W_pos]=Entry; /* add entry */
    fifo->W_pos++; /* adjust W_pos and Entries_current */
    fifo->W_pos %=fifo->Entries_max;
    fifo->Entries_current++;
    WAKE_READER( );/* wake reader if he is blocked */
    UNLOCK( );
}
```

Below is a representation of logical steps that may be performed in an embodiment to retrieve an element from the shared memory FIFO. If the FIFO is empty, then the Reader is blocked until signaled by a writer storing the next entry in the FIFO structure.

```
Fifo_Entry_Read(struct Fifo_Body *fifo, int *Entry)
/* Normally the entire logic section below is interlocked against the writer.
This LOCK and the subsequent UNLOCK ensure this.
```

In some implementations a LOCK and UNLOCK can be dispensed with if the following logic can be implemented with an ATOMIC COMPARE AND SWAP (CAS) instruction that can simultaneously update R_pos W_pos and Entries_current and determine if the update was successfully interlocked against the writer */

```
    LOCK( );
    while   (fifo->Entries_current=0)   {WAIT_ON_
WRITER( ); }/* wait for entry to be present */
    *Entry=fifo->Entries[fifo->R_pos]; /* remove entry */
    fifo->R_pos++; /* adjust R_pos and Entries_current */
    fifo->R_pos %=fifo->Entries_max;
    fifo->Entries_current--;
    WAKE_WRITER( );/* wake writer if he is blocked */
    UNLOCK( );
}
```

The foregoing may be implemented using two semaphores, a reading semaphore RSEM and a writing semaphore WSEM. A reader may be blocked on RSEM when waiting for a new entry to be written by a writer. The writer writing an entry may signal any reader blocked or waiting on RSEM. A writer may be blocked on WSEM when waiting for a new entry to be available for writing. A reader may signal any blocked writer waiting on WSEM after the reader reads a next FIFO entry.

A SHM FIFO may be implemented in a variety of different ways than as described herein to synchronize communication between the sender and receiver and also to implement the data structure.

In connection with the foregoing techniques, the client and server in U-U communications may utilize a pipe, shared memory for storing command data and two SHM FIFOs for communicating command offset locations in the shared memory. The pipe may be used for termination detection to detect when either of the client or server terminates. The pipe may also be used in connection with processing a command in backup mode rather than utilize the shared memory for the command data and the SHM FIFOs. In the backup mode, the pipe is used as a means for termination detection and also as a means to transmit the command data between the client and server in a bi-directional manner. Each of the client and server may have a thread reading from the pipe. The receiver of a message using each of the SHM FIFOs may use a thread which is signaled to read received command offsets. The pipe may be used in connection with initial processing as described herein to setup the other mechanism using shared memory for the U-U communications.

The pipe may be used in connection with termination detection so that a registered thread receives notification when a read error occurs. The foregoing read error is received by one of the client or server indicating that the other using the same pipe has terminated. The foregoing enables the registered thread which is notified on termination to perform any needed cleanup. Cleanup may include freeing any consumed resources. On the server side, it may include draining any commands currently being processed upon client failure and then invoke the close-handler callback on the server side. On the client side, it may include forcing completion with a failure or error for those outstanding commands upon server failure. As an example, a client may receive an error code (be notified) that the server terminated prior to completion of outstanding execution requests. On the client-side, there may be blocked threads waiting to be signaled upon completion of the execution results by the server which has now terminated. As a result, when the client receives an indication that the server has terminated with outstanding execute threads, the client can perform processing to signal waiting execute threads such as those threads or modules from which synchronous execute calls are made.

On the server side, when open-handler is performed, context information may be locally stored in the server regarding the context for the current session or connection started with the client as indicated by the context parameter. Based on the context information, the server may then keep track of each subsequent exec-handler invocation performed on behalf of that particular client associated with the context. If the close handler is invoked for a particular context, the close handler is able to perform any cleanup for commands in progress having the same context (indicating the same client-server connection). The foregoing context passed as a parameter with the open handler may also be characterized as a tag uniquely identifying the particular session or connection between the client and server. The context may be used as a tag identifying other command requests from the client associated with this same tag. The context and other tracking information may be stored locally in the server user container. Additionally, the open-handler callback may also include a user-context parameter including additional context information used to track command requests as well as other information that may be used by the callbacks.

The completion callback, if specified, indicates asynchronously performing a command request with respect to the user code invoking the execute API. In order to enable the user code to track the particular command request when completed, the completion callback includes a completion-callback-context. The user code may specify a value for the completion-callback-context to enable tracking the particular command or execute invocation. The completion-callback-context may be used by the completion callback to synchronize or match the completion callback invocation with a corresponding execute instance. If the completion call is not specified, the execute invocation is performed synchronously and the invoking code waits inline until control returns from the API execute code.

If an execute invocation is specified without an input-prepare callback, one embodiment may perform a memory copy to copy data from input-buffer-base having input-len (e.g., as indicated with the execute input parameters), to the input data area such as may be included in the shared memory location. If an execute invocation is specified without a output-prepare callback, one embodiment may perform a memory copy to copy data from the output data area, such as may be included in the shared memory location, to output-buffer-base having output-len (e.g., as indicated with the execute input parameters). In one embodiment, if one or more of the output-prepare and input-post callbacks are not specified, no alternative processing or action may be performed. If specified, the output-prepare callback as described herein may be invoked to perform preprocessing on the output buffer prior to invoking the server to perform a requested command. For example, the output-prepare callback may prepopulate the output buffer such as to initialize the output data area with metadata such as descriptors.

What will now be described are techniques that may be used in connection with U-K and K-U communications using the techniques herein. An embodiment using the techniques herein for he U-K and K-U cases may use different mechanisms for facilitating communication between a user container and the kernel container. When communicating with code executing in kernel mode, the kernel cannot terminate and still have a user process or container continue execution. Thus, there is no need to have code in user space be notified upon kernel termination.

Techniques for use with the U-K case for facilitating communication between code executing in user space as a client and code executing in kernel space as a server (e.g., from a user container to a kernel container) will now be described.

Figure 11A:
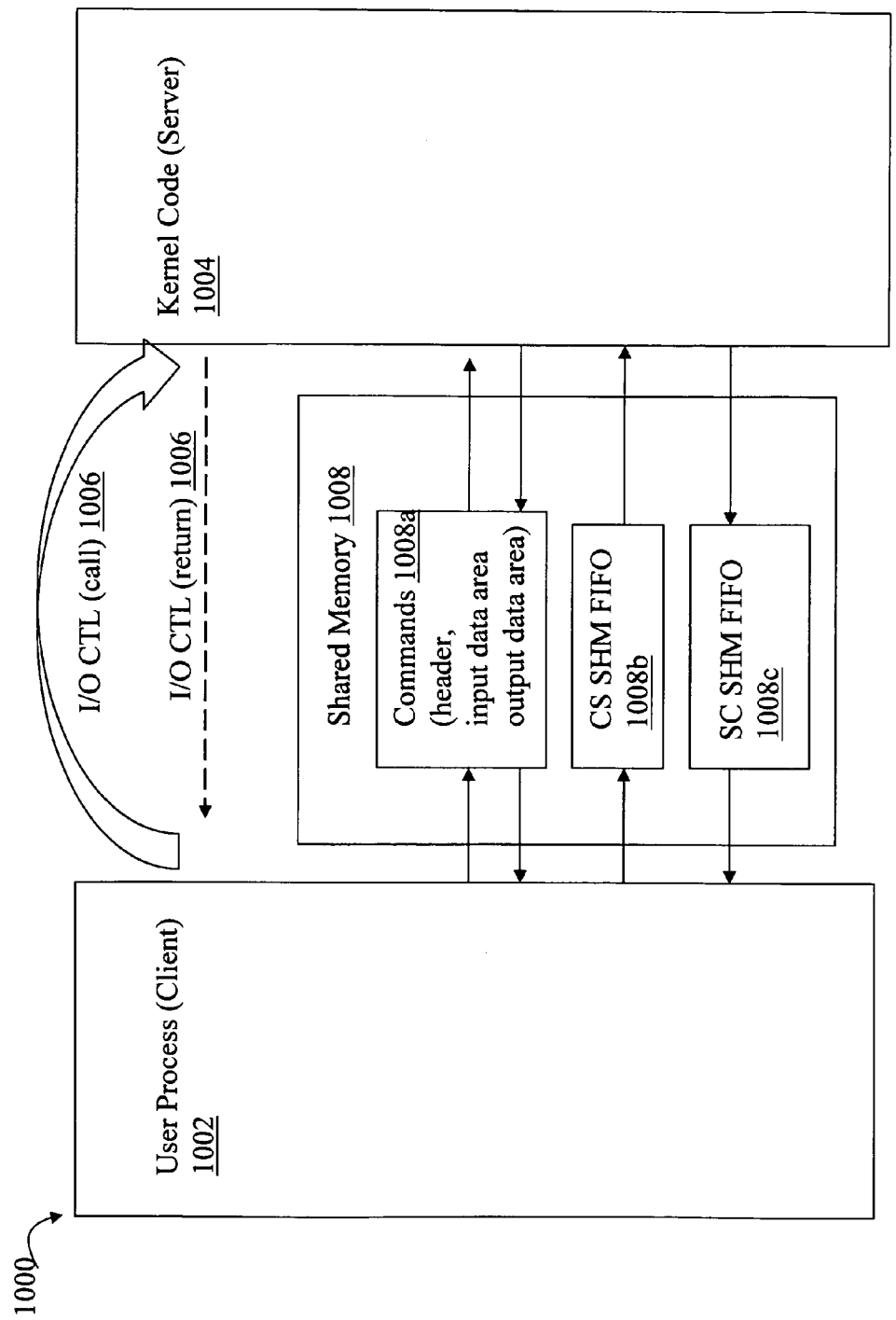
FIGS. 11A-11B are examples illustrating resources that may be used in connection with the U-K (user space to kernel space) communications in embodiments using the techniques herein.

Referring to FIG. 11A, shown is an example illustrating U-K communications in an embodiment using the techniques herein. The example 1000 includes a client user process 1002, a server that is a kernel container or code executing in kernel space 1004, shared memory 1008, and a system call from 1002 to 1004 indicated as an I/O CTL (I/O control) call or request. In following paragraphs in connection with the U-K case, the user process 1002 may also be referred to as the client and the kernel code 1004 may also be referred to as the server.

In connection with normal command processing, the command data may be stored in an area of shared memory 1008a similar to that as described for the U-U case. Additionally, the SHM FIFOs 1008b and 1008c may be used similar to that as described for the U-U case. The I/O CTL mechanism may be used for termination detection to indicate when the client has terminated. Additionally, the I/O CTL or system call may be used as a backup mode to communicate command data to the server from the client in the event there is a problem encountered with using shared memory 1008a for the command data. In one embodiment, a kernel routine or thread may be registered as a handler which is invoked when an I/O CTL or system call is made from user mode. A device may be created in kernel space and opened as a file descriptor by the user process 1002. The user process 1002 may issue an I/O CTL or system call to this kernel device. A kernel routine may be registered as the handler to handle such I/O CTL calls or requests to the kernel device. A close with respect to the kernel device may be performed when the user process 1002 terminates so that the registered handler of the kernel code 1004 is notified upon termination of client 1002. As described above in connection with the U-U case, if the kernel device is closed and there are outstanding execute requests (e.g., exec-handler invocations) in progress, the server may perform processing to drain or terminate in commands in progress, deallocate resources and the like.

In connection with a backup mode where there is a problem encountered using shared memory area 1008*a* for storing command data, the I/O CTL mechanism may be used for client termination detection and also to communicate command data to the server and also to return command data to the client.

In connection with normal processing mode as described above where the command data may be communicated using shared memory are 1008*a*, the offset or location of the command data in 1008*a* may be communicated from the client to the server using 1008*b*, and the offset or location of the command data in 1008*a* may be communicated from the server to the client using 1008*c* as described above for the U-U case.

Figure 11B:
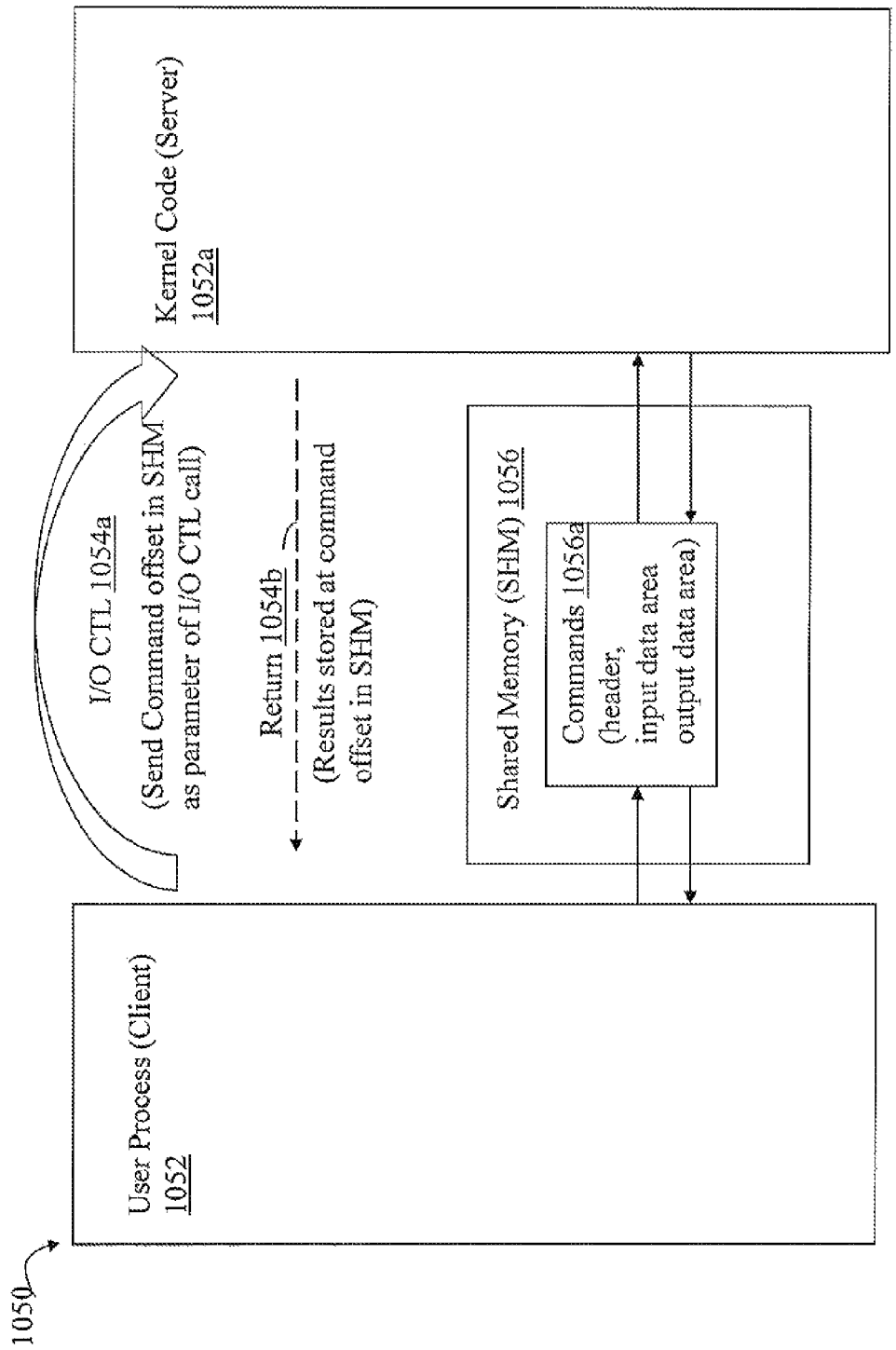

Referring to FIG. 11B, shown is an example of another way in which the techniques herein may be used to facilitate U-K communications. In the example 1050, command data may be stored in shared memory area 1056*a*. However, rather than use the two shared memory FIFOs (CS SHM FIFO 1008*b* and CS SHM FIFO 1008*c*), an embodiment may use an I/O CTL system call or request 1054*a* to send the command offset to the server from the client, and also to return 1054*b* to the client. The return 1054*b* to the client serves as a signal that server processing of the requested command is complete and the client may expect the results or output of the server processing to be included in the same location or command offset as previously sent to the server when the client initiated the I/O CTL call. In other words, an I/O CTL call is made 1054*a* to the kernel device described above with a parameter that is the command offset in 1056*a* after the client 1052 has placed the command data at the command offset location. The server 1052*a* is notified upon the occurrence of the I/O CTL call to the kernel device via a registered handler and retrieves the command data from the indicated offset location in shared memory. The kernel performs processing using the command data, stores the results in the output data area of the command data location at the command offset location, and then returns to the client 1054*b*. In connection with the embodiment of FIG. 11B, the I/O CTL mechanism is also used for client termination detection as described above using a registered handler which is notified when the kernel device is closed. An embodiment may use a different registered handler which is notified when other operations in the form of I/O CTL calls are performed with respect to the kernel device. Such other operations may include issuing an I/O CTL call to the kernel device for the command request as illustrated by 1054*a*.

Figure 11C:
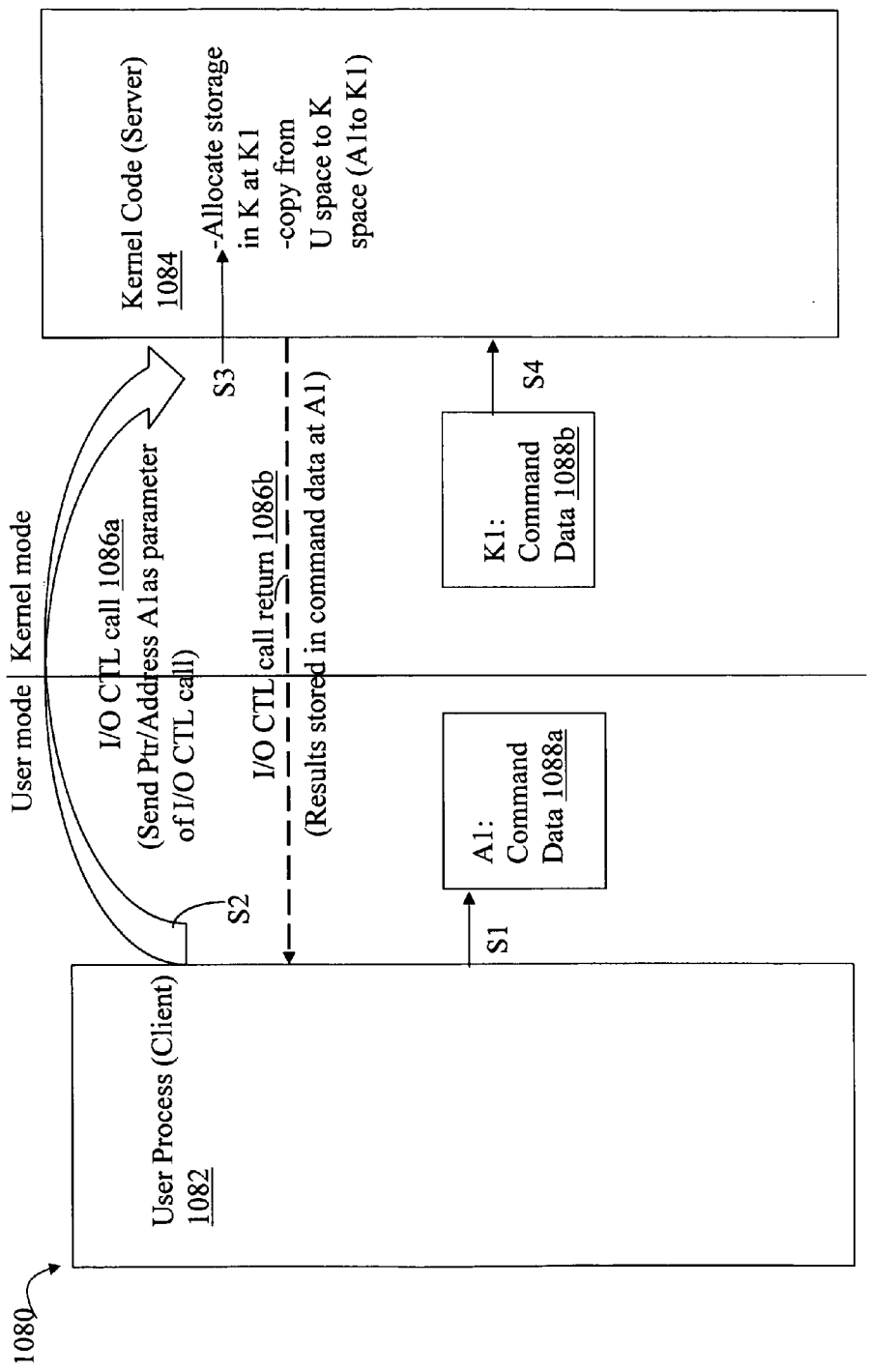
FIG. 11C is an example illustrating U-K communications using a backup mode and backup communication path to communicate command data in an embodiment using the techniques herein.

Referring now to FIG. 11C, shown is an example illustrating how the I/O CTL call may be used as a backup path for sending command data between client and server. The example 1080 may be used in connection with a backup mode for processing commands in connection with the first embodiment for U-K communications of FIG. 11A and with the second embodiment for U-K communications of FIG. 11B. In the example 1080, the client 1082 stores the command data 1088*a* at a location A1 in user space as indicated by step S1. In step S2, the client 1082 issues an I/O CTL call 1086*a* including A1 as a parameter identifying the address or pointer to the location of the command data 1088*a* in user space. In step S3, the registered kernel routine which handles the I/O CTL calls for the kernel device is invoked and performs processing to allocate storage in the kernel at a location K1 for the command data, copies the command data from user space location A1 to kernel space location K1, and then processes the command. Results are returned to the client from the kernel by having the kernel update the output data area in kernel space as part of processing of the command. Additionally output parameters (e.g., output-buffer-len-actual and output-status-code) stored in the command data may also be updated by the server. Command data is then copied from K1 (kernel space) to A1 (user space) by the server 1084 and then there is a return 1086*b* from the I/O CTL call in kernel space to the client 1082.

As compared or contrasted to the U-U case, the U-K case utilizes different techniques as described above. In particular, there is no pipe used in connection with the embodiments of the U-K case. In connection with embodiments described herein for the U-K case, the I/O CTL call may be used for termination detection when the user space process terminates effectively closing the established and opened kernel device as described above so that a registered kernel handler is invoked in response to the user space process termination. In one embodiment for U-K communications in which the command data is stored in shared memory, 2 SHM FIFOs may be used to communicate an offset location at which the command data is stored. In another embodiment for U-K communications, the I/O CTL call may be used to communicate the command offset location in shared memory rather than the foregoing 2 SHM FIFOs. In connection with embodiments described herein for U-K communications, the I/O CTL call may be used to send an address or pointer to a user-space address when operating in a backup mode for processing commands.

Processing associated with the U-K case is described in more detail in following paragraphs. Prior to describing the U-K case in more detail, an overview of techniques for use with the K-U case for facilitating communication between code executing in kernel space as a client and code executing in user space as a server (e.g., from a kernel container to a user container) will now be described.

Figure 12A:
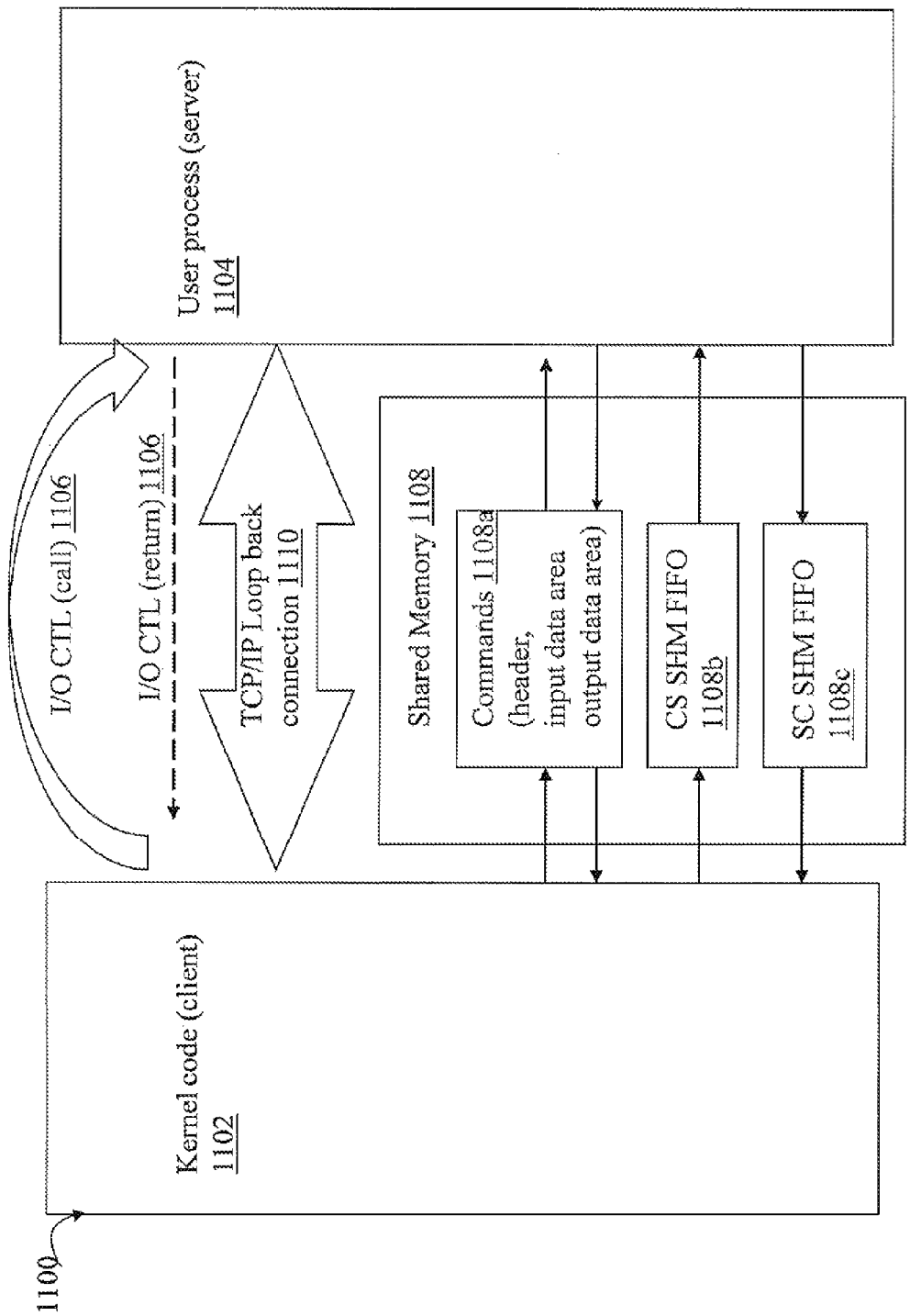
FIGS. 12A-12B are examples illustrating resources that may be used in connection with the K-U (kernel space to user space) communications in an embodiment using the techniques herein.

Referring to FIG. 12A, shown is an example illustrating K-U communications in an embodiment using the techniques herein. The example 1100 includes kernel code 1102 executing as a client, and user process 1104 executing as the server. In connection with the K-U case, the kernel code 1102 may be referred to as the client, and the user process 1104 may be referred to as the server. Shared memory location 1108*a* and the SHM FIFOs 1108*b* and 1108*c* may be used as described above in which the command data is stored in 1108*a* at an offset communicated using 1108*b* and 1108*c*. The I/O CTL mechanism 1106 may be used for server termination detection in a manner similar to that as described above using a registered kernel mode handler. The server may open a kernel device and the client/kernel 1102 may register a routine invoked when the kernel device is closed as may occur when the server/user process terminates. The registered routine may be invoked as described elsewhere herein to perform processing associated with user process termination. The registered routine may perform any needed cleanup such as detachment and/or deallocation or resources, invocation of completion callback forcing termination of commands in progress by invoking the completion callback for asynchronous execute commands or otherwise signaling any threads blocked or waiting inline for synchronous completion of execute command, updating an output-status-code indicating an error for incomplete/improper command processing, and the like. The elements 1108*a*, 1108*b* and 1108*c* may be used in connection with a normal command processing mode. In the event there are problems or errors in connection with storing command data in 1108*a*, a backup mode of command processing may be performed using a backup path to transmit command data between 1102 and 1104. In the example 1100, a loopback connection may be used as the backup path to transmit command data between 1102 and 1104 in a bidirectional manner. The loopback connection may be implemented as a TCP/IP loopback connection which used to carry or flow the actual command data between 1102 and 1104. The loopback creates a TCP/IP path to the same node/IP address. In connection with the techniques herein, the loopback connection is used by the client, K code, to communicate with server software, U-space code, on the same computer. Similarly, information may be returned from 1104 to 1102.

Figure 12B:
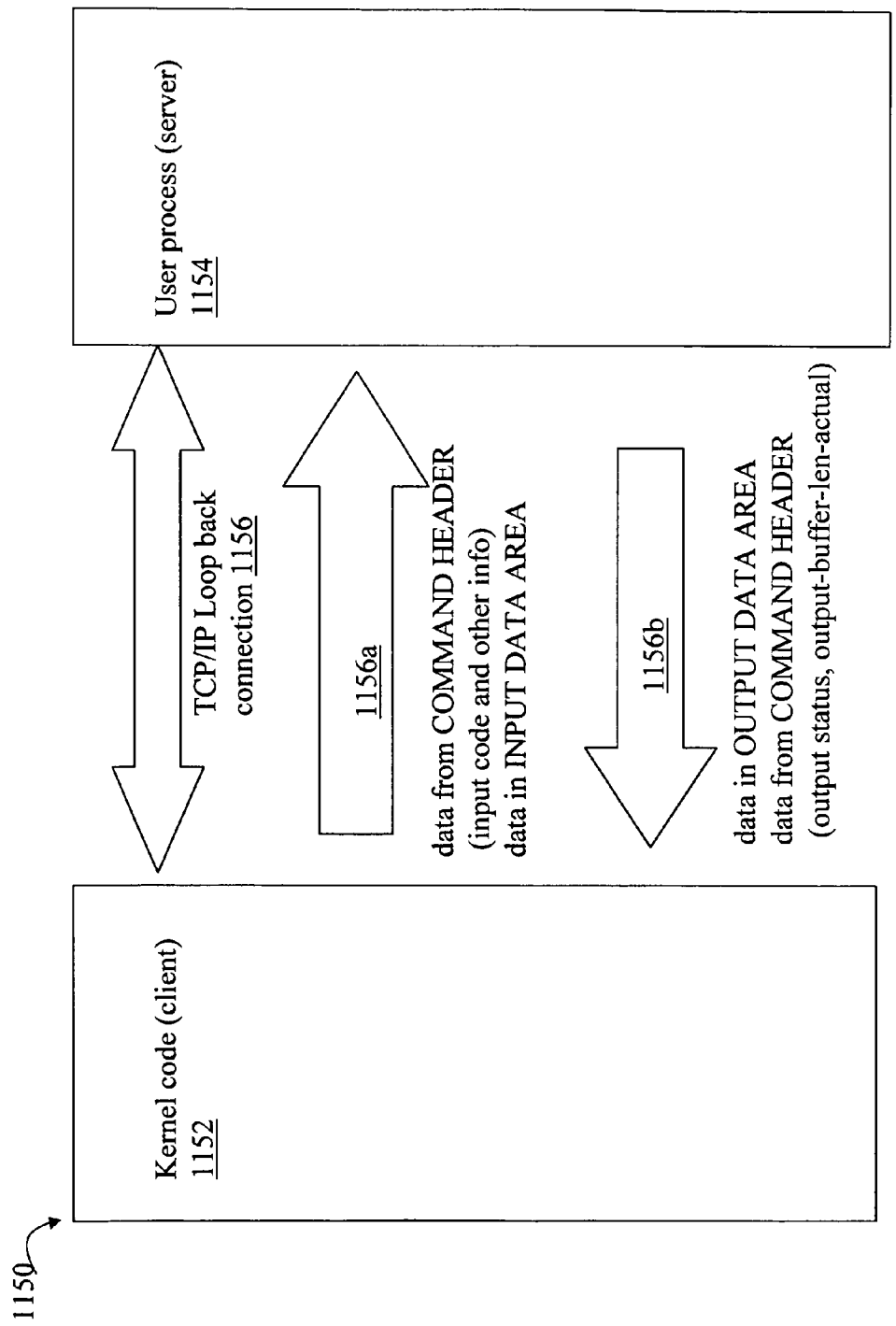

Referring to FIG. 12B, shown is an example illustrating use of the loopback connection as a backup path when operating in the backup command processing mode. Element 1156*a* illustrates transmitting command data, such as information included in the command header, input data area and (optionally) the output data area, from the client to the server. The server may then perform processing using the command data and return command data (e.g., information included in the command header, output data area, and (optionally) the input data area) from the server to the client as indicated by 1156*b*.

An embodiment may allocate and prepare the resources utilized for K-U and U-K communications as described herein in combination in connection with user space container and kernel space container initialization. Whenever a user-space process is created, code of the API may perform processing to communicate with the kernel to establish the necessary resources for U-K and K-U communications. The user-space process may initiate this processing using I/O CTL calls to communicate with the kernel rather than the pipe as described above in connection with establishing the resources for U-U communications. In one embodiment, the user process may create and prepare a portion of these resources and communicate information using I/O CTLs to the kernel code so that the kernel may attach to the resources for communicating with the user process. Also, by initiating this process, the user process may be requesting that the kernel take steps to create and prepare another portion of the resources and similarly communicate information to the user process so that the user process may attach to the kernel-prepared resources. The kernel may communicate this information to the user process as return parameter information of the I/O CTL call. The return parameter information may include data values and/or a pointer to a location containing the information. Based on the descriptions set forth above, the following resources may be created and prepared for use for K-U and U-K communications in one embodiment:

Kernel device creation for use in connection with issuing I/O CTLs and for user process space termination detection. The kernel may create a kernel device as part of kernel startup or initialization processing. As part of user process space initialization, the user process may open the kernel device to obtain a file descriptor for the kernel device. The user process may use the file descriptor in connection with issuing I/O CTL calls to the kernel device as described above.

A portion of shared memory of one or more command slots, each command slot containing data for one command. User space code may allocate and create the shared memory portion and communicate information to the kernel using I/O CTLs to the kernel device. It should be noted that two of the foregoing shared memory portions may be used in an embodiment—a first for U-K communications and a second for K-U communications.

2 SHM FIFOs for U-K communications. The sender of messages on each SHM FIFO may create the SHM FIFO and communicate information to the receiver so that the receiver can attach to receive messages. In one embodiment, the user process may initially create the CS SHM FIFO for U-K communications and then send the information to the kernel using I/O CTL parameters so that the kernel can attach. In response, the kernel may attach to the CS SHM FIFO, create the SC SHM FIFO, and send information to the user process regarding the SC SHM FIFO so the user process can attach to the SC SHM FIFO.

2 SHM FIFOs for K-U communications. The sender of messages on each SHM FIFO may create the SHM FIFO and communicate information to the receiver so that the receiver can attach to receive messages as described above.

2 semaphores for each SHM FIFO to synchronize access by message sender and receiver. These may be created by the kernel in kernel address space to facilitate any cleanup processing that is performed by the kernel upon client process termination.

Loopback connection. In one embodiment, the kernel code may open a communication channel to a user process when first needed during execution. The channel between the kernel and user process may be defined as a loopback connection to the same IP address using TCP/IP.

I/O CTL calls from U to K may be used as described herein to establish the resources used for U-K and K-U communications. In such a embodiment, the I/O CTL call may include one or more parameters identifying the requested operation issued by the user process.

Figure 13A:
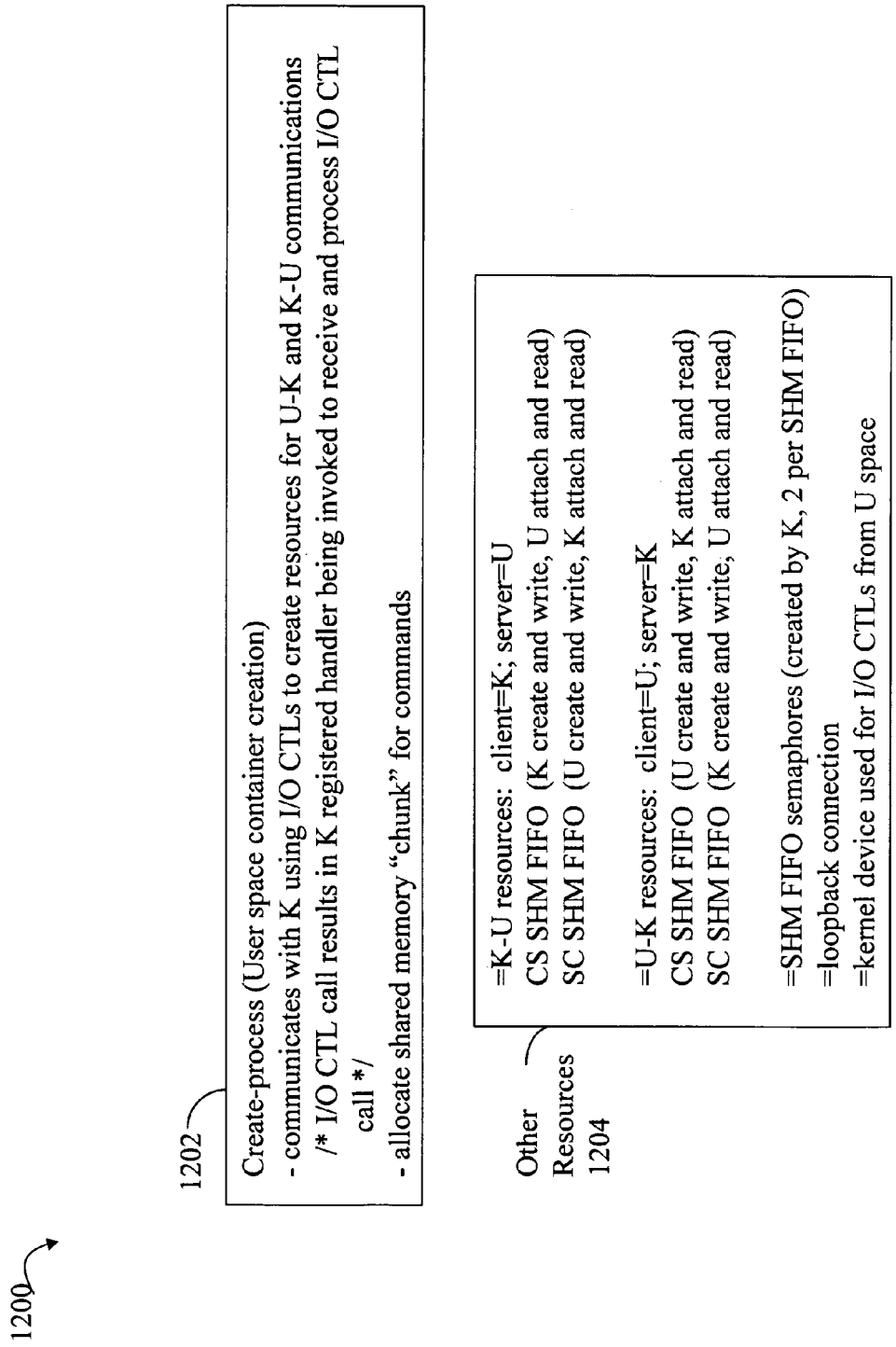

Referring to FIG. 13A, shown is an example illustrating processing that may be performed to establish the resources used for U-K and K-U communications in an embodiment using the techniques herein. The example 1200 illustrates processing described above. Element 1202 represents steps that may be performed by API code, such as code for creating a user-space process. Code 1202 executing in user space may communicate with the kernel using I/O CTLs resulting in the kernel handler being invoked to receive and process the I/O CTL call. The exchange with the kernel as initiated by the user-space code of 1202 results in establishing the resources needed for K-U and U-K communications. Elements 1202 and 1204 summarize resources that may be established for use in connection with K-U and U-K communications.

It should be noted that, although not explicitly stated in connection with the U-K and K-U communications, an embodiment may also create and use threads to read received messages on the different SHM FIFOs as described herein in connection U-U communications.

Logical processing steps that may be performed by API code for the U-K and K-U cases has many similarities to that as described above in connection with the U-U case with variations to utilize the different resources for inter-module communications. The U-K case will now be described in more detail.

Referring to FIG. 13B, shown is an example illustrating logical processing that may be performed by code of the execute API for the U-K case. Element 1252 represents logical processing steps as may be performed by client-side API code executing in user space. Processing may initially allocate a command slot in the shared memory to hold the command data and invoke the input-prepare and output-prepare callbacks. Element 1254 includes steps that may be performed for processing commands in a normal mode in which the command data is stored in shared memory and the command offset or location in shared memory is communicated using the CS and SC SHM FIFOs. Element 1256 includes steps that may be performed for processing commands in a normal mode in which the command data is stored in shared memory and the command offset or location in shared memory is communicated using the I/O CTL calls. Element 1258 includes steps that may be performed for processing commands in a backup mode using the backup path of I/O CTL calls for communicating command data.

In connection with the normal processing mode and using the SHM FIFOs, element 1254 processing includes filling in the command data portion in shared memory (including the command header), sending the command offset to the server over the CS SHM FIFO, and waiting for the server to return control to the client by sending a message to the client over the SHM FIFO. The user space thread (referred to as SCM in the example 1250) may be signaled to read the command offset message received on the SC SHM FIFO. The SCM or reader thread may retrieve the command data from shared memory, invoke input-post and output-post callbacks, free the command slot or area from shared memory, and invoke the completion callback.

In connection with the normal processing mode and using I/O CTL calls to transmit the command offset location in shared memory, element 1256 processing includes filling in the command data portion in shared memory (including the command header), sending the command offset to the server using an I/O CTL call, and waiting for the server to return control to the client. Subsequently, the execute API may perform the following inline: retrieve the command data from shared memory, invoke input-post and output-post callbacks, free the command slot or area from shared memory, and invoke the completion callback.

In connection with the backup command processing mode and using an I/O CTL call to communicate an address of the command data, element 1258 processing includes filling in the command data (including the command header) for transmission to the server at an address in user space, sending the user space location at which the command data is stored to the server as an I/O CTL parameter and waiting for the server to return control to the client. Subsequently, the input-post, output-post, and completion callbacks are invoked.

Figure 13C:
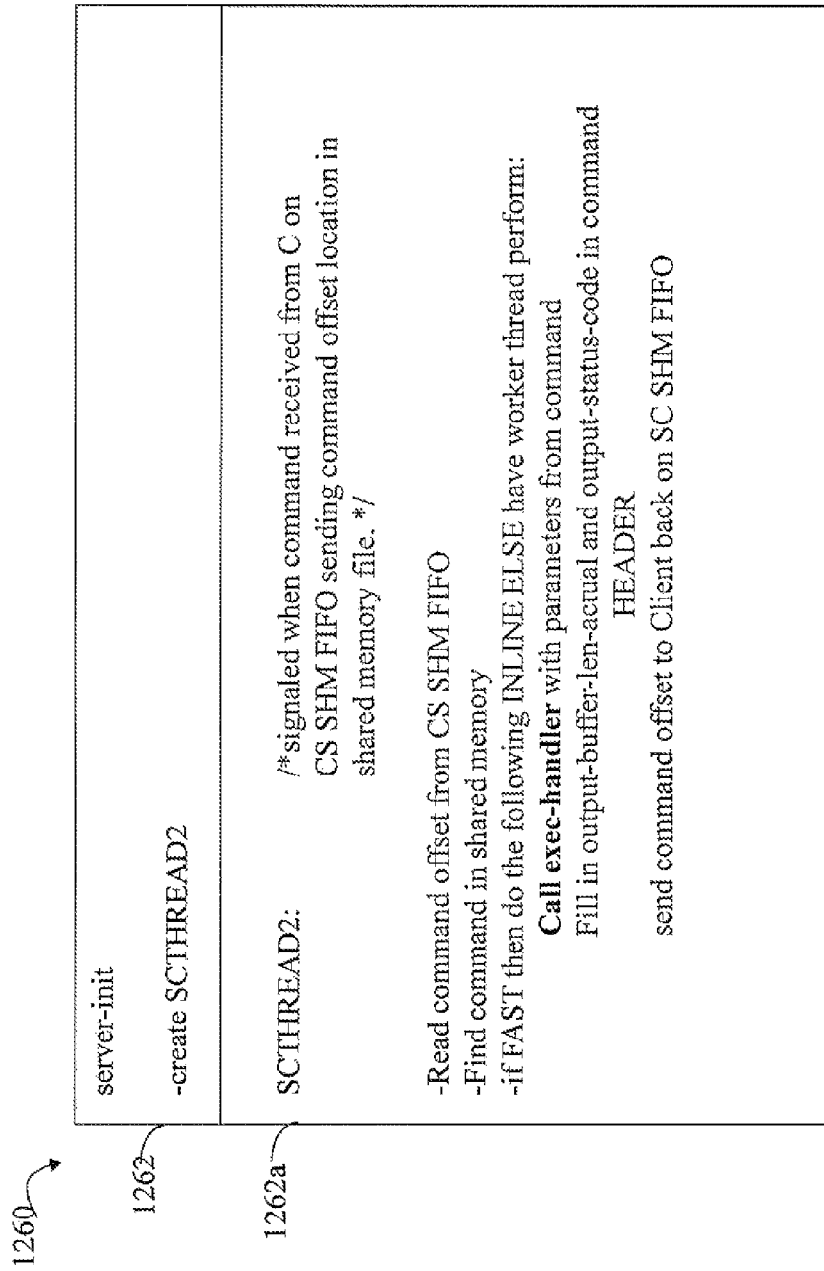

Referring to FIG. 13C, shown is an example illustrating logical processing that may be performed by code of the server API for the U-K case. The example 1260 illustrates steps that may be performed in connection with normal command mode processing in which the SHM FIFOs are used to communicate command offsets or locations in shared memory between the client and server. Element 1262 represents logical processing steps as may be performed by server-side API code executing in kernel space for the server-init API to create the thread SCTHREAD2 having a code body that performs processing as indicated in 1262a. SCTHREAD2 may be a thread created to monitor and read from the CS SHM FIFO as described elsewhere herein, for example, in connection with FIG. 9C for the U-U case.

Figure 13D:
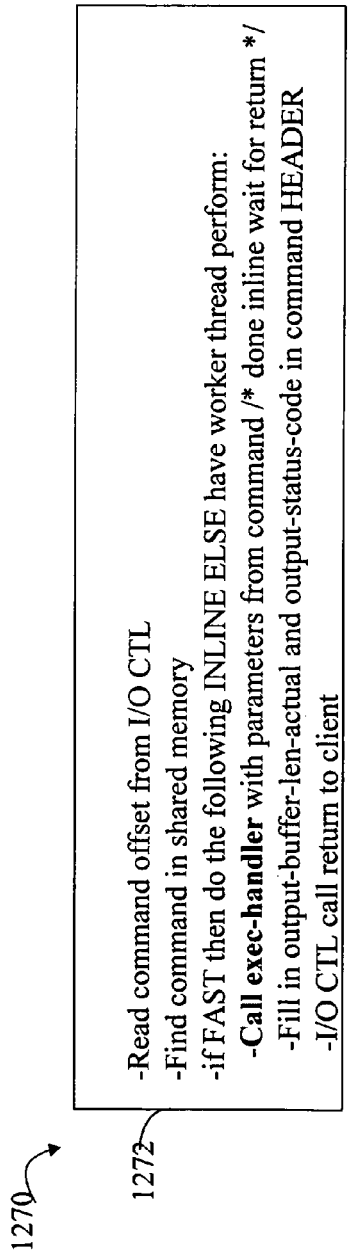

Referring to FIG. 13D, shown is an example illustrating logical processing that may be performed by code of the server API for the U-K case. The example 1270 illustrates steps that may be performed by the registered handler routine called to receive and process I/O CTLs issued from the user process to the kernel device as described above. Processing may include: reading the command offset from the I/O CTL parameter list, and finding and retrieving the command data in shared memory. The following is then performed either by the registered handler inline or by a worker thread: invoke exec-handler with appropriate parameters populated from the command data, filling in values for the output parameters, output-buffer-len-actual and output-status-code in the command header, and then returns from the I/O CTL call to the client. It should be noted that processing of the registered handler when the I/O CTL call is used as the backup communication path to transmit the address of the command data in user-space is similar to that as described in the example 1270. In this latter case, the kernel registered handler takes care of allocating any kernel space storage for the command data, copying the command data to and from user-space and kernel space, and then returning from the I/O CTL call to the client to signal that server processing of the command request has completed as described elsewhere herein.

Figure 13E:
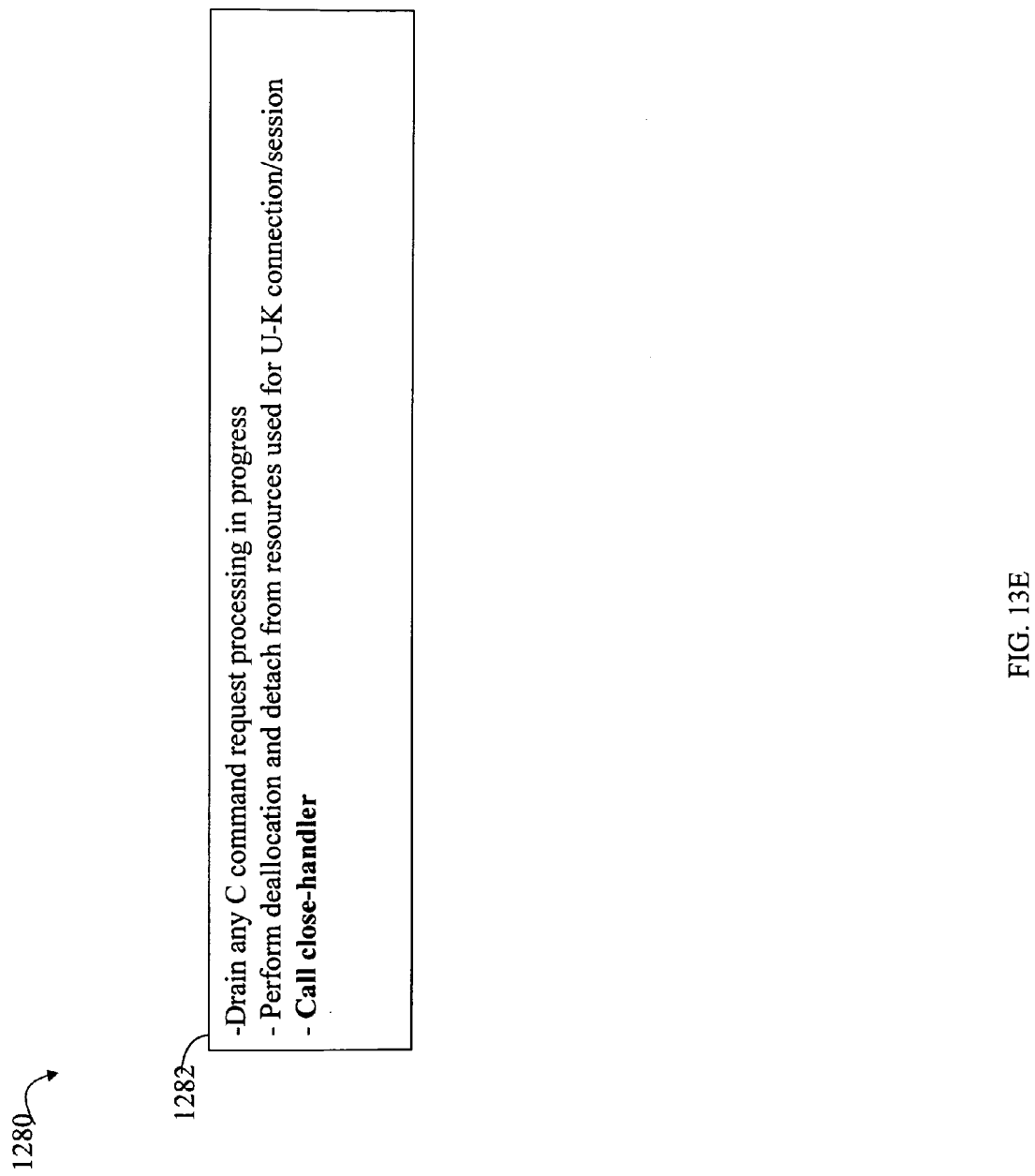

Referring to FIG. 13E, shown is an example illustrating logical processing that may be performed by code of the kernel server API for the U-K case as part of termination detection processing. Element 1282 represents logical processing that may be performed by a kernel registered handler invoked when the file descriptor of the kernel device used in connection with I/O CTL calls as described herein for U-K and K-U communications is closed. As described above, this may occur when the user process terminates or otherwise closes the kernel device. In response as indicated by 1282, the kernel API code may drain any outstanding or in-progress command requests, detach and deallocate any resources used for communications with the user process, and invoke the close-handler callback.

What will now be described is additional detail regarding the K-U case.

Figure 14A:
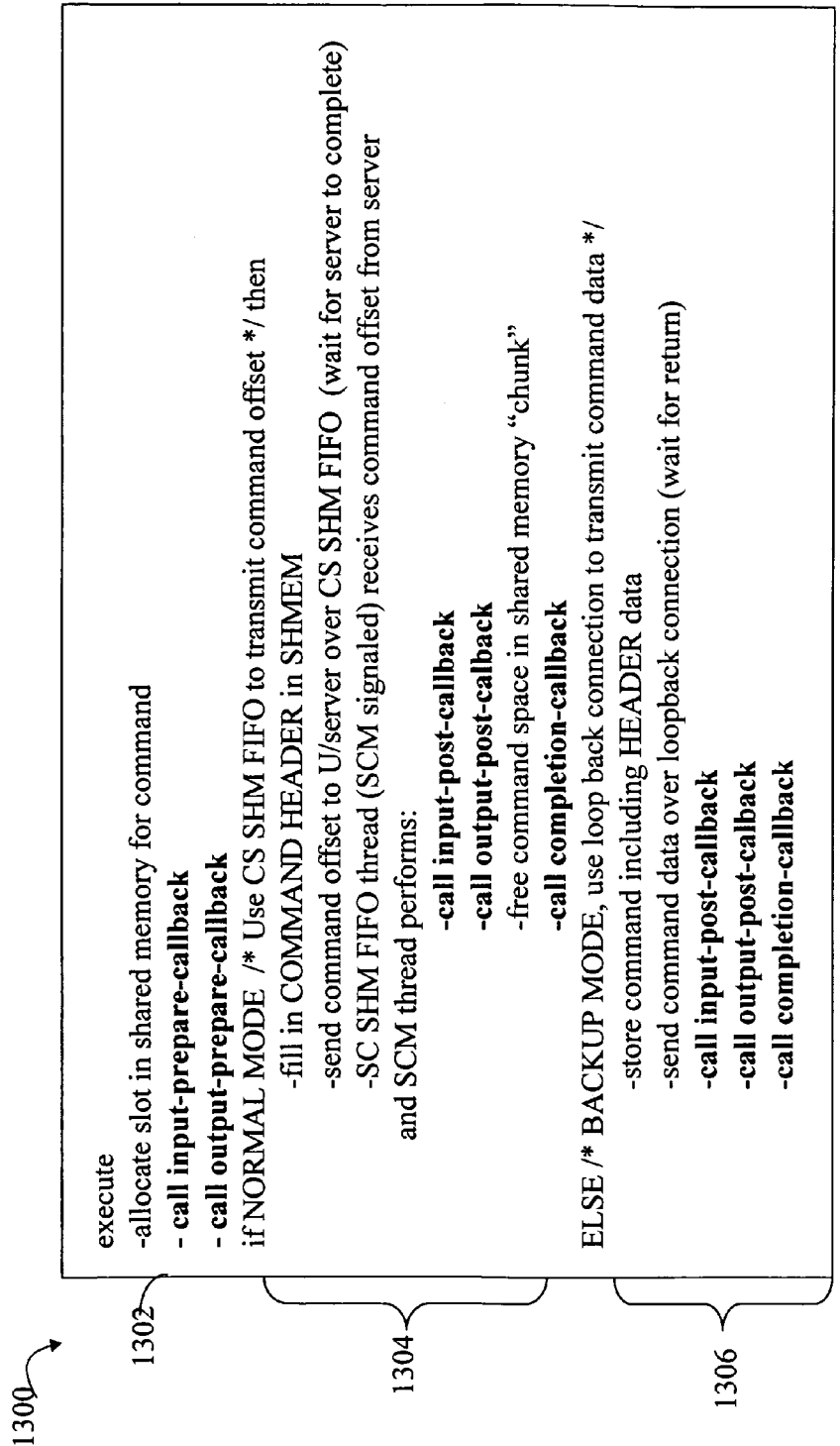
FIGS. 14A and 14B are examples illustrating in more detail processing steps that may be performed in connection with the K-U case in an embodiment.

Referring to FIG. 14A, shown is an example illustrating logical processing that may be performed by code of the execute API for the K-U case. Element 1302 represents logical processing steps as may be performed by client-side API code executing in kernel space. Processing may initially allocate a command slot in the shared memory to hold the command data and invoke the input-prepare and output-prepare callbacks. Element 1304 includes steps that may be performed for processing commands in a normal mode in which the command data is stored in shared memory and the command offset or location in shared memory is communicated using the CS and SC SHM FIFOs. Element 1306 includes steps that may be performed for processing commands in a backup mode in which the backup path of the loopback connection is used for communicating command data.

In connection with normal command processing mode, element 1304 processing includes filling in the command header in shared memory, sending the command offset to the server using the CS SHM FIFO and waiting for the server to send a message using the SC SHM FIFO. Subsequently, the SCM thread monitoring the SC SHM FIFO invokes input-post and output-post callbacks, frees the command slot or location for the command data in shared memory for use with other commands, and invokes the completion-callback.

In connection with backup command processing mode, element 1306 processing includes preparing the command data, including the command header, transmitting the command data to the server over the loopback connection and waiting inline for the server to return command processing results (e.g., as may be included in the output data area of the command). Subsequently, the after control has returned from the server, the input-post, output-post and completion callbacks are invoked.

Figure 14B:
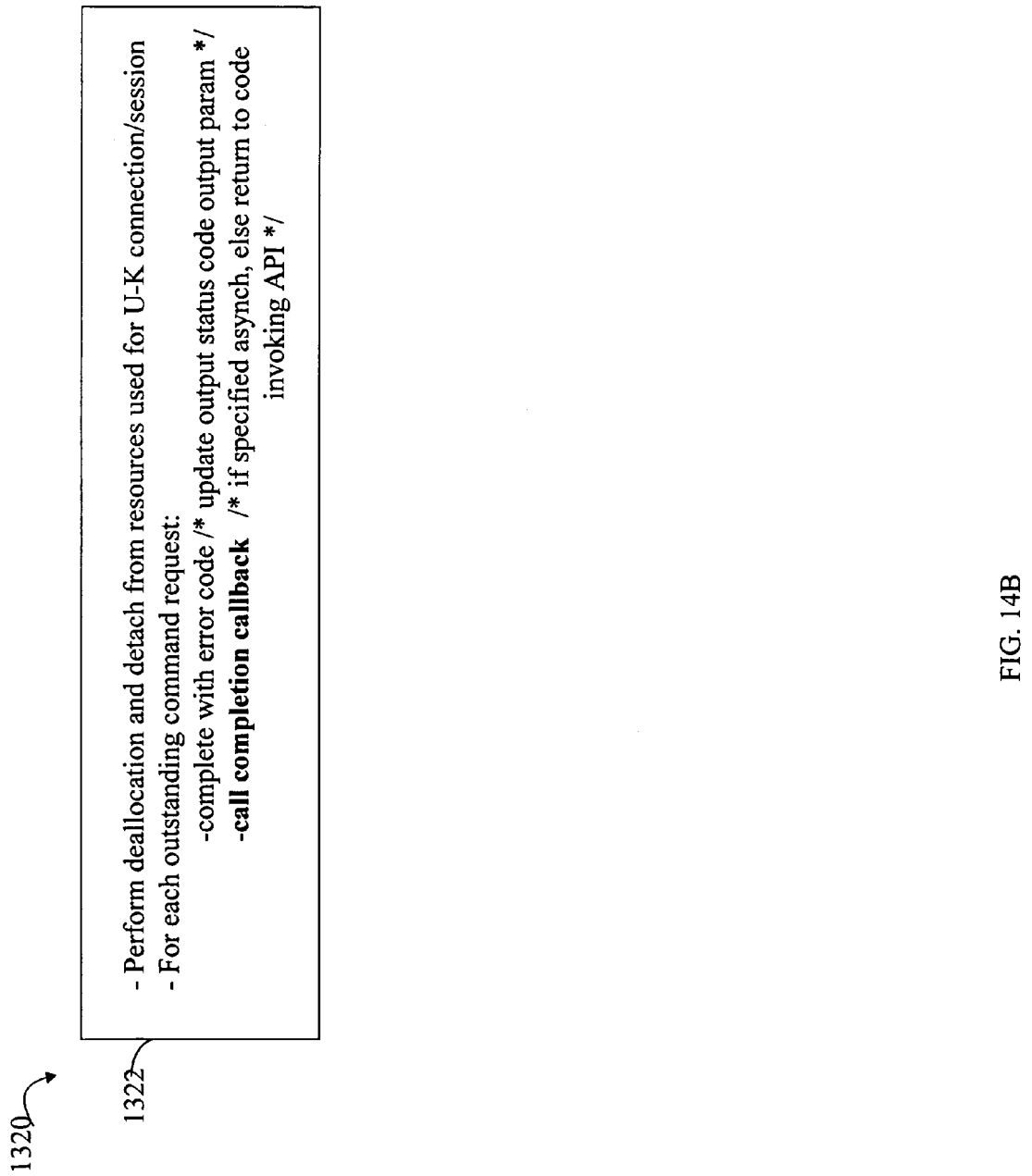

Referring to FIG. 14B, shown is an example illustrating logical processing that may be performed by code of the server API for the K-U case as part of termination detection processing. Element 1322 represents logical processing that may be performed by a kernel registered handler invoked when the file descriptor of the kernel device used in connection with I/O CTL calls as described herein for U-K and K-U communications is closed. As described above, this may occur when the user process terminates or otherwise closes the kernel device. In response as indicated by 1322, the kernel API code may detach and deallocate any resources used for communications with the user process. Additionally, for each outstanding command request, any return or output parameters may be appropriately set to indicate an error condition or improper termination status (e.g., updating the output-status-code accordingly). For each asynchronous outstanding execute call, the completion-callback is invoked. For each synchronous outstanding execute call, control may be returned to the invoking code.

In connection with K-U communications, the server executing in user space may include code similar to that as described in connection with FIG. 13C to read incoming command offsets from the client. When executing in backup mode, both the client and server may include code to prepare, and send and receive command data over the loopback connection as described above. For example, the client may include code for forming and sending command data over the TCP/IP loopback connection to the server. The client may block or wait until a response is received over the loopback connection from the server. The server may include a thread which is signaled to read incoming command data sent over the loopback connection from the client. The thread may also prepare and transmit command data from the server to the client after the server has processed a command. The logic is similar to that as described above in connection with other cases except that the loopback connection is used to transmit the command data rather than, for example, the pipe as with the U-U case.

It should be noted that as described above, the K-U and U-K cases may use the I/O CTL mechanism for termination detection using a first registered handler or routine which is notified and invoked when the kernel device is closed as occurs upon user process termination. In connection with the U-K case when the user-space client issues a command request to the kernel-space server, the client issues an I/O CTL call or system call to the kernel device. A second registered kernel handler or routine is notified and invoked in response to the call. The second registered routine processes the command request and then returns to the client. The client is notified regarding completion of server processing as a result of the second registered routine returning to the client from the I/O CTL or system call.

Figure 15:
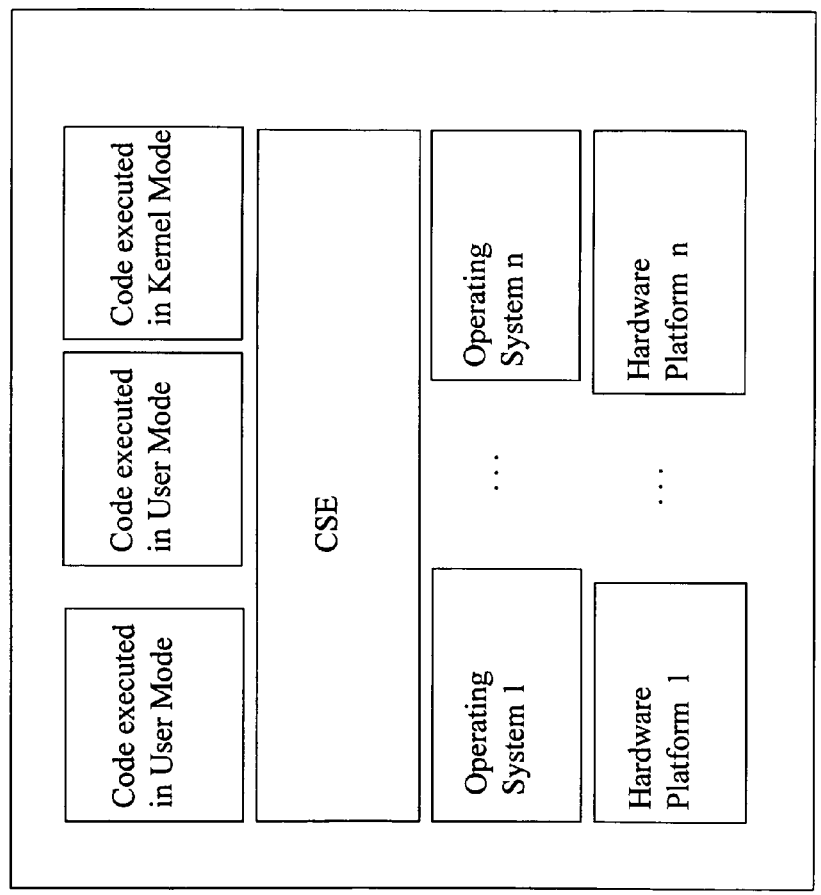
FIG. 15 is an illustration of the different operating systems and hardware platforms that may be included on a data storage system for use with the techniques herein.

Referring now to FIG. 15, shown is a representation illustrating the relationship of the common software environment (CSE) components to other components of the data storage system. In the example 1400, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code written using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Although the techniques herein are illustrated in an exemplary embodiment of a data storage system, the techniques herein may be used in connection with code executing on any computer processor on any system. Additionally, although the API provided is included in a common software environment to provide a common interface for code that executes in user and kernel mode, the techniques described herein for intermodule or communication between user mode modules or containers (e.g. such as processes) may be used independently and separately from the techniques described herein for intermodule communication between a user container including code executing in user mode and a kernel container including code executing in kernel mode (e.g, U-K and/or K-U). As an example, an embodiment may use the techniques described herein for one or more of U-U, U-K and/or K-U. Although a common API may be used as described herein, it will be appreciated by those skilled in the art that techniques for one or more of U-U, U-K and/or K-U communications may or may not be implemented using a common API.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of intermodule communication between a first code module and a second code module comprising:
providing said first code module and a second code module, one of said first and second code modules executing in user space and the other of said first and second code modules executing in kernel space;
providing a shared memory portion including storage for one or more commands and which is accessible to said first and said second code modules;
providing a first first-in-first-out (FIFO) structure for sending a location in said shared memory portion from said first code module to said second code module;
providing a second FIFO structure for sending a location in said shared memory portion from said second code module to said first code module;
storing, by said first code module, command data for a command at a first location in said shared memory portion; and issuing a command from said first code module to said second code module by sending said first location from said first code module to said second code module using said first FIFO structure, and wherein the method further comprises:
providing a kernel device to which said one code module executing in user space issues a system call, wherein a registered routine of said other code module executing in kernel mode is notified when said kernel device is closed by said one code module, said kernel device being closed when said one code module terminates causing invocation of said registered routine.

2. The method of claim 1, wherein said command is a request from said first code module for said second code module to perform processing in accordance with said command data stored at said first location in shared memory.

3. The method of claim 1, wherein said first FIFO structure and said second FIFO structure are implemented using another portion of shared memory accessible to said first code module and said second code module.

4. The method of claim 1, wherein said first code module includes a first call to code of an application programming interface, said first call including one or more callbacks referencing a location in said first code module.

5. The method of claim 4, further comprising:
invoking, by said code of said application programming interface, a first of said one or more callbacks prior to performing said issuing, said first callback performing processing in connection with input data included in said command data stored at said first location in said shared memory portion.

6. The method of claim 5, wherein said command data includes a header portion, an input data area, and an output data area, said header portion including metadata for said command and storage for one or more input parameters and one or more output parameters.

7. The method of claim 6, wherein said one or more input parameters and input data in said input data area are sent to said second code module from said first code module, and said one or more output parameters and output data in said output data area are sent from said second code module to said first code module.

8. The method of claim 7, further comprising:
performing, by said second code module, processing in accordance with said command data;
storing output data in said output data area in accordance with said performing;
storing values for said one or more output parameters in accordance with said performing; and
sending a message from said second code module to said first code module as a response to said command by sending said first location from said second code module to said first code module using said second FIFO structure.

9. The method of claim 8, wherein said performing processing by said second code module includes invoking one or more callbacks referencing locations in said second code module, said one or more callbacks in said second code module being included in a first call of Page said second code module to code of an application programming interface, said first call of said second code module occurring prior to execution of said step of performing processing by said second code module.

10. The method of claim 8, further comprising performing additional processing by said first code module upon receiving said message from said second code module, said additional processing including:
invoking a second of said one or more callbacks in said first code module to perform post processing on one or more of said input data area and said output data area.

11. The method of claim 10, wherein said issuing of said command is performed asynchronously with respect to said first code module, and the method further comprising:
invoking a third of said one or more callbacks of said first code module after said second callback to indicate completion of said command.

12. The method of claim 1, wherein, said first code module executes in user space and said second code module executes in kernel space, and if said first code module is unable to use said shared memory portion for storing command data, said first code module issues a system call to said kernel device, said system call including a parameter that is an address of a location in user space at which said command data is stored, wherein, in response to said system call being issued by said first code module, a second registered routine in said second code module is invoked and performs processing including:
receiving said parameter;
allocating storage in kernel space;
storing said command data at said storage in kernel space;
performing processing of said command data stored in kernel space;
updating command data stored at said user space location; and
returning to said first code module.

13. The method of claim 1, wherein said first code module executes in kernel space and said second code module executes in user space, and if said first code module is unable to use said shared memory portion for storing command data, said first code module and said second code module communicate using a loop back connection and sending said command data over said loopback connection.

14. The method of claim 4, wherein said first call included in said first code module uses a first defined interface, said first defined interface being used when said first code module executes in user space and said first defined interface being used when said first code module executes in kernel space.

15. The method of claim 9, wherein said first call of said second code module to code of an application programming interface uses a first defined interface, said first defined interface being used when said second code module executes in user space and said first defined interface being used when said second code module executes in kernel space.

16. A data storage system comprising executable code stored on a computer readable medium for intermodule communication between a first code module and a second code module, the computer readable medium comprising executable code for:
providing said first code module executing in user space and said second code module each executing in kernel space;
providing a shared memory portion including storage for one or more commands and which is accessible to said first and said second code modules;
providing a kernel device to which said first code module issues a system call that is a command request handled by a registered routine in said second code module, said registered routine being notified when said first code module issues said system call;
storing, by said first code module, command data for a command at a first location in said shared memory portion; and issuing a command from said first code module to said second code module by issuing a system call to said kernel device resulting in invocation of said registered routine, a parameter of said system call being said first location in said shared memory, wherein a second registered routine in said second code module is notified when said first module closes said kernel device, said first code module closing said kernel device when said first code module terminates causing invocation of said second registered routine.

17. The data storage system of claim 16, wherein said first code module includes a call to code of an application programming interface, said call including one or more callbacks referencing a location in said first code module.

18. The data storage system of claim 16, wherein said second code module includes a call to code of an application programming interface, said call including one or more callbacks referencing a location in said second code module.

* * * * *